US007409635B2

(12) United States Patent
Epstein

(10) Patent No.: US 7,409,635 B2
(45) Date of Patent: Aug. 5, 2008

(54) DISPLAY/LAYOUT METHODS AND APPARATUSES INCLUDING CONTENT ITEMS AND DISPLAY CONTAINERS

(75) Inventor: Samuel S. Epstein, Sammamish, WA (US)

(73) Assignee: Zalag Corporation, Sammamish, WA (US)

( * ) Notice: Subject to any disclaimer, the term of this patent is extended or adjusted under 35 U.S.C. 154(b) by 0 days.

(21) Appl. No.: 11/281,780

(22) Filed: Nov. 16, 2005

(65) Prior Publication Data

US 2006/0107204 A1    May 18, 2006

Related U.S. Application Data

(60) Provisional application No. 60/628,448, filed on Nov. 16, 2004, provisional application No. 60/628,194, filed on Nov. 16, 2004, provisional application No. 60/636,495, filed on Dec. 16, 2004.

(51) Int. Cl.
*G06F 17/00* (2006.01)
(52) U.S. Cl. ..................................................... 715/243
(58) Field of Classification Search ................ 715/517, 715/500, 200, 243, 253, 246, 247
See application file for complete search history.

(56) References Cited

U.S. PATENT DOCUMENTS

| | | | | |
|---|---|---|---|---|
| 5,181,162 A | * | 1/1993 | Smith et al. ................. | 715/530 |
| 5,323,312 A | * | 6/1994 | Saito et al. ................... | 715/513 |
| 5,390,354 A | | 2/1995 | de Heus et al. | |
| 5,438,512 A | | 8/1995 | Mantha et al. | |
| 5,517,621 A | | 5/1996 | Fukui et al. | |
| 5,544,301 A | * | 8/1996 | Orton et al. ................. | 715/798 |
| 5,555,362 A | * | 9/1996 | Yamashita et al. .......... | 715/517 |
| 5,557,722 A | | 9/1996 | DeRose et al. | |
| 5,600,771 A | | 2/1997 | Hayashi et al. | |
| 5,669,005 A | | 9/1997 | Curbow et al. | |
| 5,680,619 A | | 10/1997 | Gudmundson et al. | |
| 5,752,020 A | * | 5/1998 | Ando ............................ | 707/4 |
| 5,845,303 A | * | 12/1998 | Templeman ................. | 715/517 |
| 5,873,106 A | | 2/1999 | Joseph | |
| 5,911,146 A | | 6/1999 | Johari et al. | |
| 5,953,733 A | * | 9/1999 | Langford-Wilson ......... | 715/517 |
| 6,023,714 A | | 2/2000 | Hill et al. | |
| 6,044,384 A | | 3/2000 | Ishima et al. | |
| 6,055,522 A | | 4/2000 | Krishna et al. | |
| 6,088,709 A | * | 7/2000 | Watanabe .................... | 715/512 |
| 6,105,044 A | | 8/2000 | DeRose et al. | |
| 6,144,974 A | | 11/2000 | Garland | |

(Continued)

OTHER PUBLICATIONS

Pattison et al., Information Visualisation Using Composable Layouts and Visual Sets, Google 2001, pp. 1-10.*

(Continued)

*Primary Examiner*—Cong-Lac Huynh
(74) *Attorney, Agent, or Firm*—Schwabe, Williamson & Wyatt, P.C.

(57) ABSTRACT

Methods and apparatuses for generating rendering layout specifications for content items to be rendered, using display containers, and/or rendering the content items using the generated rendering layout specification are disclosed. In various embodiments, the generating of a rendering layout specification may include one or more of selecting a display container for a content item, selecting a content item for a display container, and selecting a display container for a display container.

34 Claims, 19 Drawing Sheets

U.S. PATENT DOCUMENTS

| | | | |
|---|---|---|---|
| 6,366,918 | B1 | 4/2002 | Guttman et al. |
| 6,370,679 | B1 * | 4/2002 | Chang et al. .................. 716/19 |
| 6,589,292 | B1 * | 7/2003 | Langford-Wilson ......... 715/517 |
| 6,667,750 | B1 | 12/2003 | Halstead et al. |
| 6,813,746 | B1 * | 11/2004 | O'Shea ....................... 715/517 |
| 6,826,727 | B1 | 11/2004 | Mohr et al. |
| 6,892,226 | B1 | 5/2005 | Tso et al. |
| 6,928,610 | B2 | 8/2005 | Brintzenhofe et al. |
| 7,000,182 | B1 * | 2/2006 | Iremonger et al. .......... 715/517 |
| 7,003,722 | B2 * | 2/2006 | Rothchiller et al. ......... 715/513 |
| 7,010,746 | B2 | 3/2006 | Purvis |
| 7,028,255 | B1 * | 4/2006 | Ayers .......................... 715/517 |
| 2002/0032554 | A1 * | 3/2002 | Nakagawa ..................... 703/8 |
| 2002/0078098 | A1 * | 6/2002 | Shirai .......................... 707/517 |
| 2005/0094206 | A1 * | 5/2005 | Tonisson ................... 358/1.18 |
| 2005/0108711 | A1 * | 5/2005 | Arnold et al. ............... 718/100 |
| 2006/0044604 | A1 * | 3/2006 | Mirmotahari .............. 358/1.15 |
| 2006/0064630 | A1 * | 3/2006 | Balinsky ..................... 715/500 |
| 2006/0080622 | A1 * | 4/2006 | Stuart .......................... 715/853 |
| 2006/0090146 | A1 * | 4/2006 | LeBritton et al. .............. 716/4 |
| 2006/0103891 | A1 * | 5/2006 | Atkins ........................ 358/450 |
| 2006/0156227 | A1 * | 7/2006 | Hosotsubo .................. 715/517 |
| 2006/0200758 | A1 * | 9/2006 | Atkins ........................ 715/517 |
| 2006/0236299 | A1 * | 10/2006 | Sahouria et al. ............... 716/21 |

OTHER PUBLICATIONS

Harel et al., An Algorithm for Blob Hierarchy Layout, ACM 2000, pp. 29-40.*

Huang et al., How People Read Graphs, ACM 2005, pp. 51-58.*

Fogarty et al., Aesthetic Information Collages: Generating Decorative Displays that Contain Information, ACM 2001, pp. 141-150.*

Szepieniec et al., The Genealogical Approach to the Layout Problem, ACM 1980, pp. 535-542.*

Lok, Simon and S. Feiner, "A Survey of Automated Layout Techniques for Information Presentations," Proceedings of the SmartGraphics Symposium Hawthorne, New York, 2001 pp. 61-68.

Jacobs, Charles et al., "Adaptive Grid-Based Document Layout," ACM Transactions on Graphics, pp. 838-847, 2003.

Lok et al., A Survey of Automated Layout Techniques for Information Presentations, pp. 61-68, 2001.

Pattison et al., Information Visualisation Using Composable Layouts and Visual Sets, 2001 Google, p. 1-10.

* cited by examiner

Figure 8a

DISPLAY/LAYOUT METHODS AND APPARATUSES INCLUDING CONTENT ITEMS AND DISPLAY CONTAINERS

RELATED APPLICATIONS

The present application is a non-provisional application of provisional applications 60/628,448 (filed on Nov. 16, 2004), 60/628,194 (filed on Nov. 16, 2004) and 60/636,495 (filed on Dec. 16, 2004), and claims priority to the three enumerated provisional applications.

TECHNICAL FIELD

Embodiments of the present invention relate to the field of data processing, in particular, to layout and/or rendering methods and apparatuses.

BACKGROUND

Notwithstanding the significant advances made in the past decades, Web and print publishing technology continue to suffer from a number of disadvantages preventing users from fully realizing the benefits that may flow from advances in computing and related technology.

For example, current publishing technology is unable to flexibly accommodate content items of different sizes within display presentations. Specifically, most Web sites continue to be unable to allow display of content items of different sizes, such as advertisements of different sizes, to appear in a given position within a Web page, without incurring unacceptable layout effects, such as overlapping of content items, internal wasted space, unreadable text, and so forth.

Another example is current publishing technology failing to take full advantage of the available area of display presentations to display information. Specifically, Web sites cannot take full advantage of available area of client browser windows to display content items, such as advertisements. Client browser windows often use a variety of screen resolutions and window sizes. To accommodate the largest number of potential viewers, Web pages are typically authored using small fixed widths. As a result, the majority of clients can view the Web pages without horizontal scrolling. But then clients with larger displays have unused real estate. HTML and CSS allow Web pages to be authored with percent widths, so that HTML/CSS Web pages stretch to fit large client display widths. However, layouts with percent widths can generate internal wasted real estate. Even if no real estate is wasted, percent widths do nothing to use increased real estate for additional information display.

Still another example is the manner current publishing technology handles situations where there's more information to display than will fit in a display presentation. Current Web technology provides facilities to allow scrolling in the display window, for the users to access the information that did not fit in the display window. Specifically, Web browsers provide horizontal and/or vertical scrollbars in situations where a Web page to be displayed is larger in at least one dimension than the Web browser window. Some Web sites use downloadable scripts that affect information display within a particular region of the page, so that more information may be cycled through this region than will fit in the region all at once. Some of these sites fit formatted or unformatted text into the region, according to the region's dimensions as determined by standard HTML/CSS layout rules, with text layout sensitive to the reader's specified preferences for such parameters as number of columns. For these sites, the reader may direct successive portions of a text flow to appear within the designated region, so that the successive renderings of the region are analogous to pages of a printed document. However, there's currently no way to cycle content items through multiple regions of a display window while maintaining paged presentations in one or more regions of the window, while not requiring the cycled content items to conform to fixed region sizes, and while allowing all information to be visible in the display window without scrolling. One consequence is severely limited possibilities for displaying advertising in Web-based periodicals.

Still another example is the limited ability of current Web technology to accommodate changes to displayed constituents that occur as the user views the display. Currently, constituents can replace other constituents in regions with fixed dimensions, where the old constituent and new constituent have approximately the same fixed dimensions. It's also currently possible for constituents to appear into what would otherwise be empty space, and for constituents to expand into empty space. Conversely, it's currently possible for constituents to be replaced by empty space, and for constituents to shrink so that part of the area they formerly occupied becomes empty space. Further, it's currently possible to expand into and shrink from empty space through a ripple effect applying along a single dimension. For example, given a vertical column with multiple constituents and empty space on the bottom, if a constituent that's not at the bottom expands, the constituents that lie below it can shift downward accordingly, with a corresponding reduction of the amount of empty space at the bottom of the column. Outside these bounds, with current Web technology, changes to displayed constituents are liable to incur unacceptable layout effects, such as overlapping of content items, internal wasted space, unreadable text, and so forth.

Grid-based templates have long been a standard basis for specifying families of layouts. More recently, container-based templates have become a standard basis for specifying families of Web layouts. For example, current server page technology allows dynamic content to be directed to HTML containers, such as tables, or to specific slots in HTML containers, such as table cells. Current Web authoring models, current automated tools for authoring print layouts, and current technology for serving dynamic Web content are all limited by their reliance on variants of the template model.

Above are just examples and not all the disadvantages and/or problems addressed by the present invention.

BRIEF DESCRIPTION OF THE DRAWINGS

Embodiments of the present invention will be described by way of exemplary embodiments, but not limitations, illustrated in the accompanying drawings in which like references denote similar elements, and in which:

FIGS. 8a-8c illustrate an example problem the present invention may be applied to address, which is to permit full use of the available areas of computer display windows;

DETAILED DESCRIPTION OF ILLUSTRATIVE EMBODIMENTS

Figure 1:
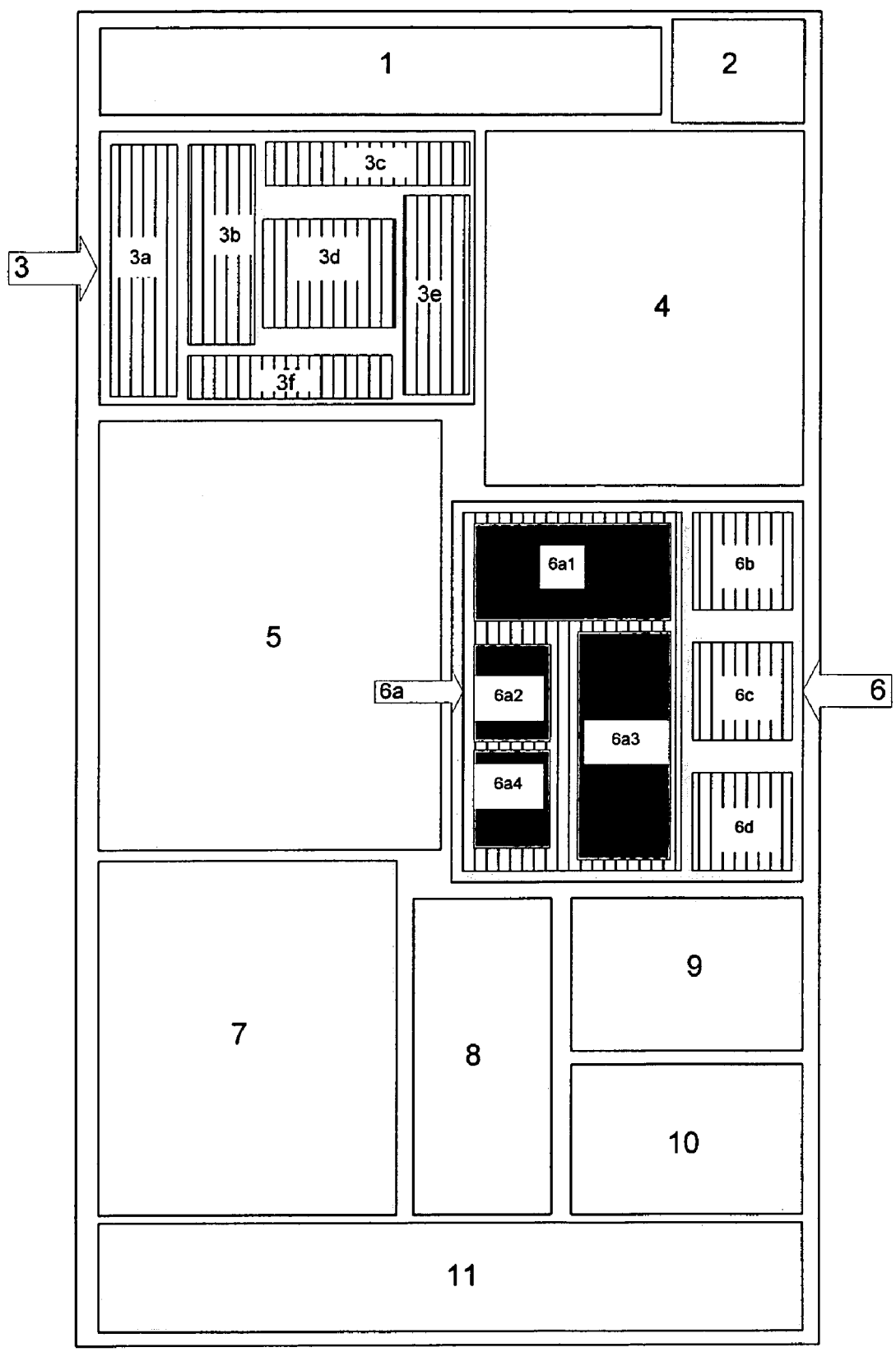
FIG. 1 illustrates the concept of a world-within hierarchy in the context of the present invention, in accordance with various embodiments.

Illustrative embodiments of the present invention include but are not limited to display layout generation and rendering methods and apparatuses, in particular, display layout generation and rendering methods and apparatuses that employ display containers.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Illustrative embodiments of the present invention will be described using terms such as "content items," "display presentations," "display units," "containers," "flows," and "display pages." For the purpose of the present invention, a "content item" is a piece of content that's perceived as self-contained, and that contains no smaller piece of content that's perceived as self-contained. Advertisements and news articles are two examples of content items. When an advertisement consists of an image and a caption, the caption by itself would typically not considered as a content item. Instead, the advertisement in its entirety would be considered a content item. Content items may be specified by users, by the staff of service providers, programmatically, or through a combination of user input, staff input, and the effects of programs.

A "display presentation" may occupy a computer display window, or a printed page, or a contiguous region within a computer display window or a printed page. Within a given display presentation, each content item corresponds to a "display unit." As a matter of convenience, when there's no possibility of confusion, a display unit may be identified with its corresponding content item.

A "display unit" is typically a single contiguous region with fixed shape and size. However, display units with variable shapes and sizes are possible, and less commonly, so are display units that correspond to discontiguous regions with specified interrelationships.

A "content item" may have rich internal structure. Treating an internally complex content item as atomic is a matter of perspective and specification. If an application calls for multiple perspectives, content items and their corresponding display units may exhibit "world-within" recursion: Top-level layout arranges top-level display units; top-level display units present "inner worlds" and are themselves subject to internal layout. Any number of levels of world-within recursion is possible in principle, though in various embodiments, the number of levels is purposely kept small.

FIG. 1 illustrates the concept of a world-within hierarchy, in accordance with various embodiments. (The arrows in FIG. 1 are shown for illustration purpose only, and they are not part of the represented layout.) At the top level of the hierarchy, there are eleven display units, each shown with a sparse dot pattern. Two of the top-level display units present inner worlds. The display unit labeled "3" includes six second-level display units, each shown with a vertical line pattern. Similarly, the display labeled "6" includes four second-level display units, each shown with a vertical line pattern. Among the four second-level display units within the display unit labeled "6," the second-level display unit labeled "6a" itself presents an inner world, with four third-level display units, each shown with dense dot pattern. A display unit that presents an inner world might or might not derive in its entirety from an internal source.

Content may take the form of markup such as HTML or XML. Alternatively, content may take the form of application-internal data structures. Content may be found in a wide variety of sources, ranging from HTML files on the public Web to binary files on a local computer. Content may be generated by variety of applications and systems. Content may be cached on the client and on servers. In various embodiments, a primary server may be employed to gather content from diverse sources. The primary server may be associated with a system of proxy servers where content is cached in anticipation of client requests. [HTML=Hypertext Markup Language, XML=Extensible Markup Language.]

Given that content items are presented in display units, and also represented in a hierarchical data structure such as markup, the term "container" as used herein has parallel meanings. In terms of display, a container of a display unit corresponds to a region that contains the display unit. In terms of hierarchical data structures, a container of a content item is a node that dominates the node corresponding to the content item. However, not every region that contains a display unit counts as a container for the display unit. And not every node that dominates the node corresponding to the content item counts as a container of the content item. Only some containing regions, and their corresponding nodes, count as containers of a given display unit and its corresponding content item. Containers for content items may be identified explicitly or implicitly by data structure authors. For example, Web site publishers may identify containers in Web site markup. In an alternative scenario, containers for content items may be identified explicitly or implicitly by end users. Mixed scenarios are also possible.

Multiple possible containers for a given content item may be identified explicitly or implicitly. For example, an advertisement within a Web page might have a table near the top of the page as one possible container, and a different table on the left of the page as another possible container. Default rules can specify how alternate containers are identified for content items for which no alternative containers have been given.

Containers may be assigned to higher-level containers within a container hierarchy. It should be emphasized that the container hierarchy is an artifact of layout, while the world-within hierarchy reflects coarser-grained or finer-grained perspectives on content. As with containers for content items, not every region that contains a container C counts as a container of C. And not every node that dominates the node corresponding to C counts as a container of C. Only some containing regions, and their corresponding nodes, count as containers of C. Higher-level containers may be specified explicitly or implicitly in the same scenarios as for bottom-level containers. Multiple possible containers for a given container may be identified explicitly or implicitly. Default rules can specify how alternate containers are identified for containers for which no alternative containers have been given.

Figure 2:
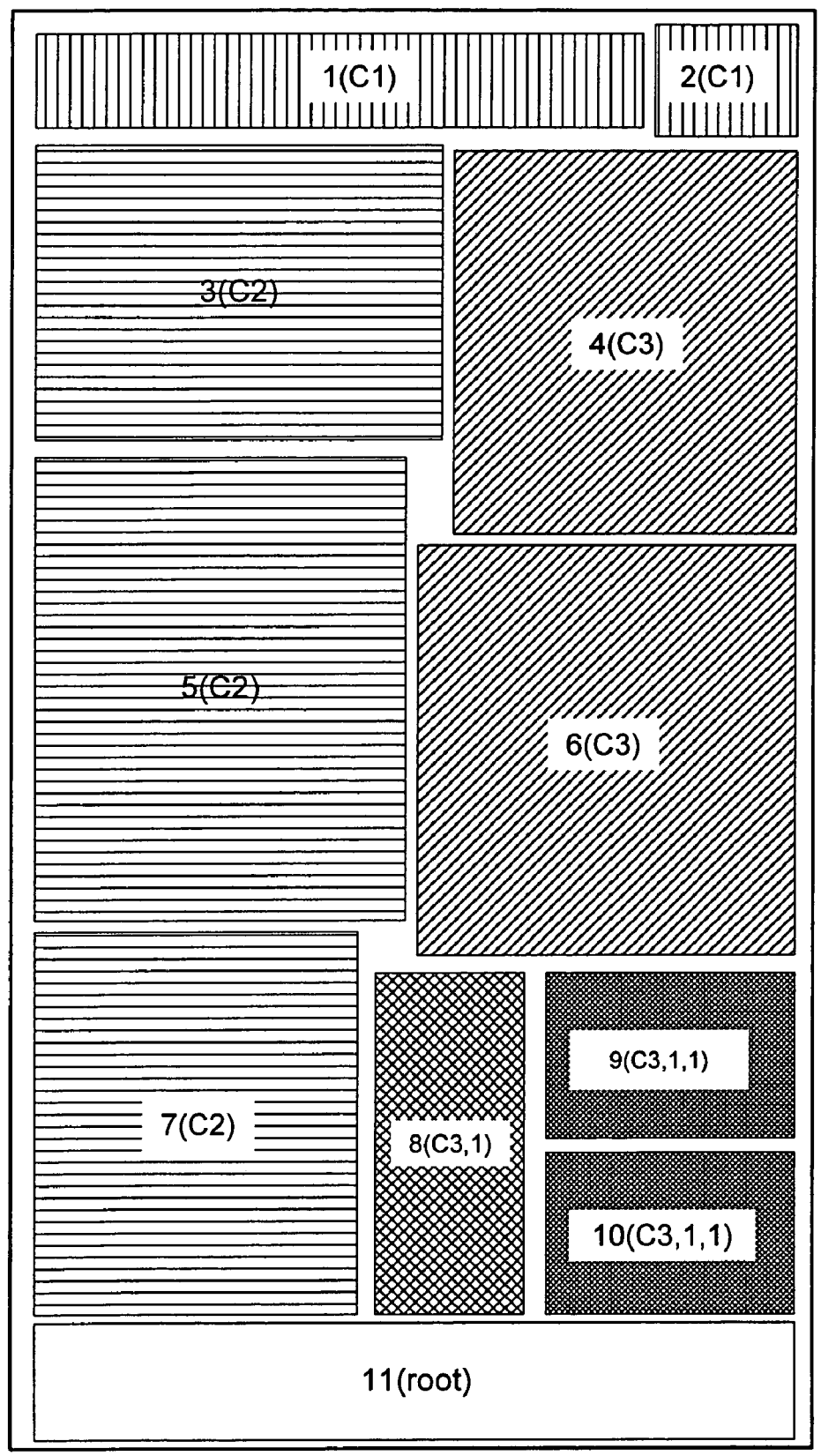
FIG. 2 illustrates the concept of a container tree in the context of the present invention, in accordance with various embodiments.

FIG. 2 illustrates a container tree, in accordance with various embodiments. Container $C_{3,1,1}$ includes the display units labeled "9" and "10." Container $C_{3,1}$ includes the display unit labeled "8," and also container $C_{3,1,1}$. Container $C_1$ include the display units labeled "1" and "2." Container $C_2$ includes the display units labeled "3," "5," and "7." Container $C_3$ includes the display units labeled "4" and "6," and also container $C_{3,1}$. The root of the container tree is a container that includes container $C_1$, container $C_2$, container $C_3$, and the display unit labeled "11." The fill patterns of the display units in FIG. 2 indicate container membership. Also, each display unit is labeled with its lowest container in parentheses.

A "template" is a configuration of containers that encompasses at least two containers that can include display units. The configuration can take the form of a tree or of some other data structure. For example, server pages are templates whose instantiations are DHTML trees. A template-based approach can feature template selection, where a set of templates is available, and one or another template is selected based on such considerations as content to be accommodated or the parameters of a target device. A template-based approach can feature recursive filling, where slots in higher templates are filled by lower templates. A template-based approach can combine template selection with recursive filling, so that sets of templates at various levels are available. One of the distinguishing characteristics of the present invention is that it works without templates, and that it can efficiently generate larger ranges of layouts than what's possible with template-based approaches.

In general, display units may overlap, as in a layered presentation. However, in many applications, display units will not be allowed to overlap. Given that display units don't overlap, two bottom-level containers $C_1$ and $C_2$ may still overlap, in the sense that the convex hull of the display units within $C_1$ overlaps the convex hull of the display units within $C_2$. A similar observation applies at higher levels of the container hierarchy. Containers may fit together like non-convex puzzle pieces. For example, in FIG. 2, the convex hull of the display units in $C_2$ overlaps with the convex hull of the set of display units in $C_3$.

Given a container C, each child of C within the container hierarchy may be called a "filler" of C and may be said to fill a "slot" of C. As a refinement of the assignment of content items to containers, content items may be assigned to specific slots within containers, and containers may be assigned to specific slots within higher containers. A slot may correspond to an ordinal, as in the $n^{th}$ slot of a container, or a slot may correspond to a tuple of ordinals, as when a table has slots corresponding to row and column positions. It may or may not be allowed that in a completed layout a container's $n^{th}$ slot is filled while its $(n-1)^{th}$ is unfilled, and similarly for slots corresponding to tuples of ordinals. It might be stipulated that if slot n is filled while slot n−1 is unfilled, slot n−1 will appear with specified place-holder content. Or slot n might simply be allowed to appear in the place of slot with a lower assigned ordinal. Or the assignment of content to slot n might be invalidated in the case when no content is assigned to slot n−1. Note that in the case of tables, if a row i has a cell with assigned content, and column j has a cell with assigned content, then the cell that belongs to row i and column j will appear no matter whether or not it has assigned content.

A "display entity" is either a container or a display unit. An "inner-outer pair" of display entities comprises an "inner member" and an "outer member," where the inner member is a candidate for placement in the outer member. A "valid inner-out pair" is an inner-outer pair such that the inner member belongs to a class of display entities α and outer member belongs to a class of display entities β, where it's stipulated that members of β are candidate containers for members of α. For example, an inner-outer pair where the inner member is a display unit and the outer member is a container might be valid, but an inner-outer pair where the inner member is a container and the outer member is a display unit cannot be valid. For content items expressed in HTML, an inner-outer pair where the inner member is an image and the outer member is a table is valid, but not vice-versa. (Recall that a containment relationship need not correspond to a parent-child relationship in a markup tree.) An inner-outer pair where the inner member is a table and the outer member is a body is valid, but not vice-versa.

Content items may have associated layout rules. For example, a content item described in HTML has associated layout rules according to the HTML standard. Similarly, containers may have associated layout rules. For example, an HTML table has associated layout rules according to the HTML standard. Standard layout rules may be supplemented through markup extensions. For example, while the number of cells in a standard HTML table is fixed, markup extensions can specify that a given table may have a variable number of cells, and can specify how rows and columns are added as the table receives more content. Default rules can specify how rows and columns are added to tables for which no extended markup is supplied.

A flow is a content item that comprises a sequence of subconstituents. Text runs are archetypical flows. In various embodiments, to qualify as a flow, a sequence of constituents is required to satisfy two conditions. First, the sequence is required to be associated with a set of layout rules that determines the placement of successive items of the sequence. For example, the successive words and delimiters of English language text runs are placed left to right on lines, with lines following each other from top to bottom. Standard and non-standard typographic rules may be in effect as refinements of these basic rules. The second required condition for a flow is that it may be "frangible." "Frangible" is defined here in terms of display presentation. A sequence of constituents is frangible if it can be divided into successive subsequences, where each subsequence is large enough to be displayed on its own in a display region. In general, there will be many ways to divide a frangible flow into such subsequences. Standard typographic rules evolved for printing offer guidance on how to set the criteria for determining which subsequences are large enough for independent display. Such subsequences may be called "displayable sub-flows." Besides text runs, other examples of flows include sequences of text and images, and other examples of flows include tables. For a sequence of text and images, standard and non-standard typographic rules may allow images to be reordered with respect to text elements, and with respect to each other. For a table, it may be possible to display the table several rows at a time, or several columns at a time.

A non-flow content item is "compatible" with a display region if its width is no greater than the width of the display window, and its height is no greater than the height of the display region. A flow is "compatible" with a display region if it can be partitioned into displayable sub-flows such that each sub-flow can be laid out so that the sub-flow is fully visible within the display region. A set of content items is "compatible" with a display region if all of its members are compatible with the display region.

A "display page" for a given display region is a layout of content items such that the horizontal and vertical dimensions of the layout substantially match the dimensions of the display region. Note that a display region that receives display pages may be a proper sub-region of a display window or a printed page. Paged presentations are not limited to display windows and printed pages. Thus a display window may simultaneously support multiple paged presentations in different sub-regions.

The present invention permits a set of content items that's compatible with a display region to be displayed in the display region so that all content is visible without scrolling. Of course, in general it's not possible to display all content items visibly within the display region at the same time. Content items are therefore apportioned across a set of display pages, which are rendered into the display region one at a time. In various embodiments, each non-flow content item appears on exactly one display page. In various embodiments, a single non-flow content item may be allowed to appear on multiple display pages. In various embodiments, each flow may be partitioned into displayable sub-flows so that each sub-flow appears on exactly one display page. In various embodiments, a particular flow constituent may be allowed to appear on multiple display pages. In various embodiments, the display pages may be unordered. In various embodiments, the display pages may be partially ordered. In various embodiments, the display pages may be linearly ordered.

Figure 3:
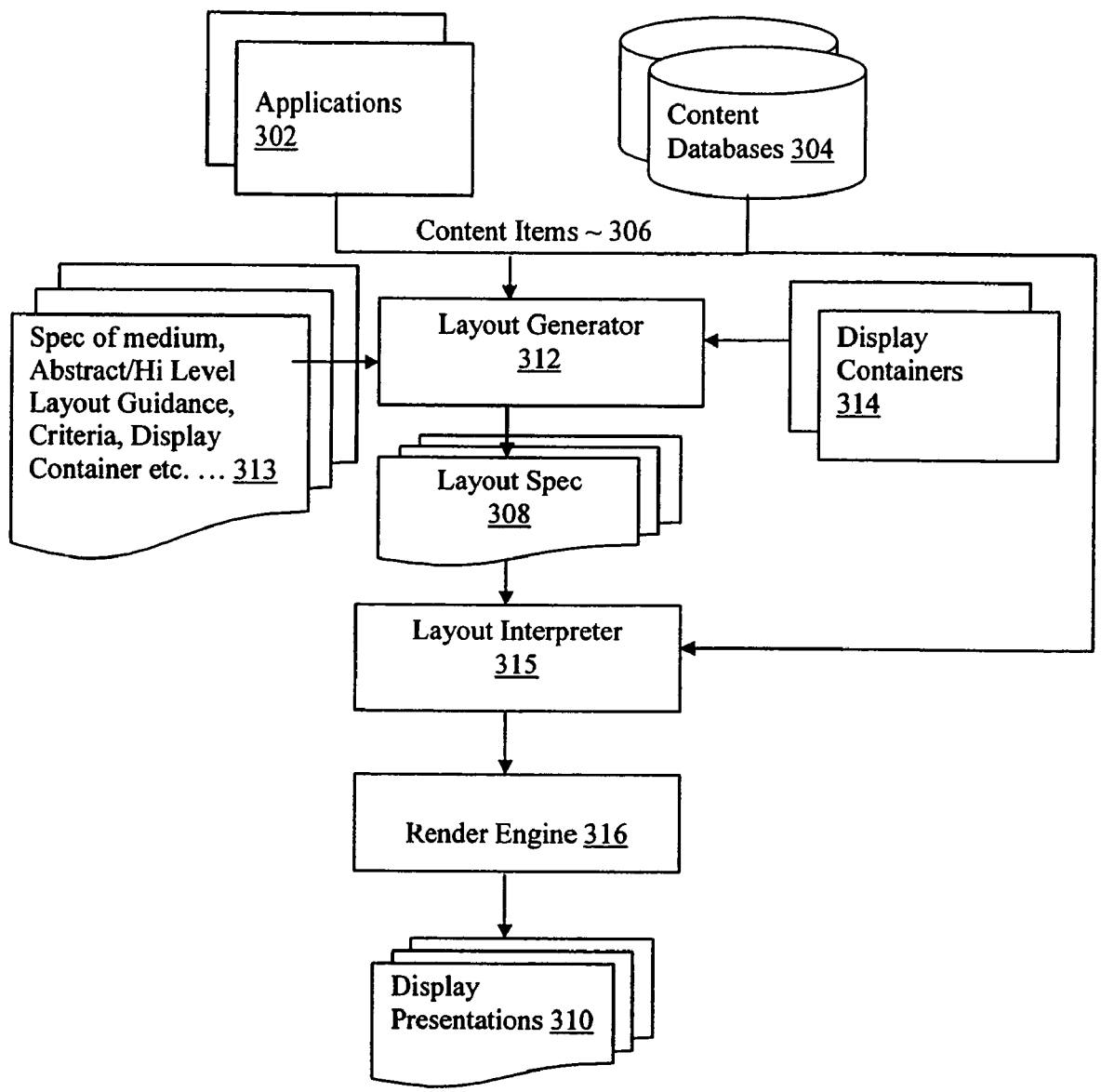
FIG. 3 illustrates an overview of the display methods and apparatuses of the present invention, in accordance with various embodiments.

Referring now to FIG. 3, wherein a block diagram illustrating an overview of the display layout generation and rendering methods and apparatuses of the present invention, in accordance with various embodiments, is shown. As illustrated, for the embodiments, different combinations of content items 306 from a variety of sources, including but not limited to applications 302, content databases 304, may be provided to layout generator 312 incorporated with the teachings of the present invention, to generate layout specifications 308 for layout interpreter 315 and render engine 316 to render content items 306 as display presentations 310 on a display window or a printed page, or in a region of a display window or printed page. Content items 306 may be single or multimedia contents from a variety of sources including local and remote data sources, e.g. a remote Web site. Display windows or printed pages, or regions of display windows or printed pages, may be of various sizes, shapes and resolutions. For client displays, client-server bandwidth information may also be provided for consideration. These media parameters may be provided to layout generator 312 in a variety of manners, via specification files, function calls, and/or other means.

As illustrated, layout generator 312 employs a number of display containers or simply containers 314 to generate layout specifications 308 for content items 306. Display containers can be provided in general or for a generation in particular. Containers 314 are assigned to content items 306 in combination based on what's appropriate or optimal for a particular collection of content items to be displayed. Of course, what's appropriate or optimal is application dependent, in particular, dependent on the criteria employed to determine appropriateness or optimality. Such criteria may vary from application to application or from implementation to implementation.

For the embodiments, layout generator 312 generates a layout specification 308 for a collection of content item 306 in accordance with media parameters, layout guidelines, display containers and/or criteria inputs 313 provided in general or for a generation in particular. Except for media parameters, the layout guidelines, display containers and/or criteria inputs 313 are typically (but not necessarily) provided at a high or abstract level, providing general guidance for layout specification generation in general or a particular generation. Layout guidelines and/or criteria inputs 313 may include but are not limited to, the target medium on which content items 306 will eventually be rendered (e.g. medium type, size, shape and so forth), the content containers to be employed, the size and/or shape of the content containers, and criteria for determining whether a layout is to be considered acceptable (such as percentage of internal blank space).

Layout interpreter 315 performs the conventional function of interpreting layout specifications 308 and generating rendering instructions (e.g. graphic function calls) for rendering engine 316 to render content items 306 as display presentations 310 on the targeted medium, in accordance with layout specifications 308. Likewise, rendering engine 316 performs the conventional function of effectuating specific rendering instructions (such as graphic function calls) to render content items 306 as display presentations 310 on the targeted medium.

While for ease of understanding, the functions performed by layout generator 312, layout interpreter 315 and render engine 316 are illustrated as three distinct components. In practice, their functions may be partitioned and assigned to different smaller modules and/or tasks. And these tasks may be executed as a single thread, or as multiple threads where appropriate. In various embodiments, the execution of layout generator 312, layout interpreter 315 and render engine 316 may be on the same system, and in other embodiments, they may be on different systems, e.g. with layout generator 312 on a server, and layout interpreter 315 and render engine 316 on a client device. For these latter embodiments, communication between layout generator 312 and layout interpreter 315 may be in accordance with any one of a number of communication protocols, including but not limited to HTTP and/or HTTPS, with or without going through one or more communication modules/layers (where HTTP=Hypertext Transmission Protocol, and HTTPS=Hypertext Transmission Protocol Secured).

In various embodiments, layout generator 312, layout interpreter 315, and/or render engine 316 may be implemented as part of a "larger" product offering. For examples, in various embodiments, all three components 312, 315 and 316 may be implemented as part of a Web Browser or a Print Driver. In still other embodiments, layout interpreter 315 and render engine 316 may be part of a Web Browser, while layout generator 312 may be part of a Web Server or a Publishing Tool.

Figure 4:
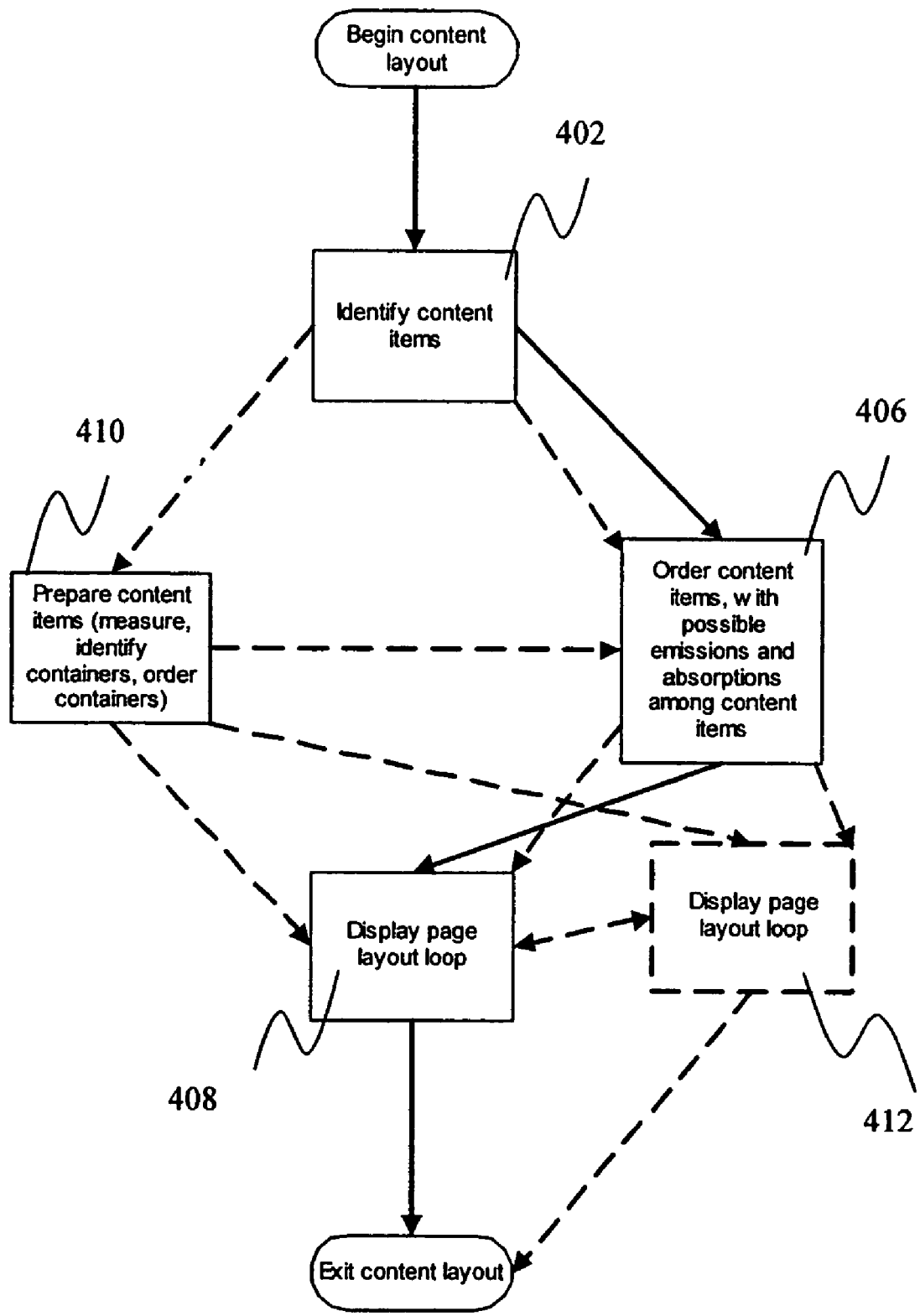
FIGS. 4-6 illustrate selected operations of the layout generator of FIG. 1, in accordance with various embodiments.
Figure 5:
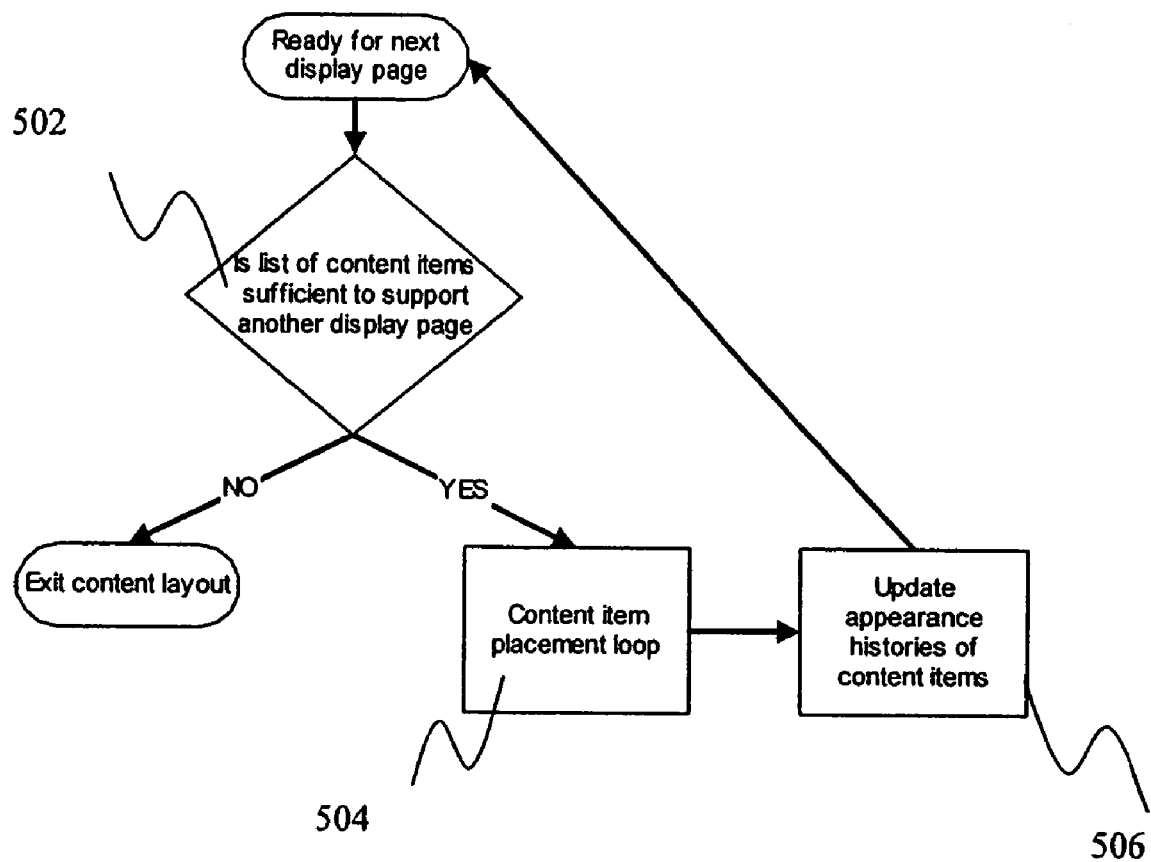
Figure 6:
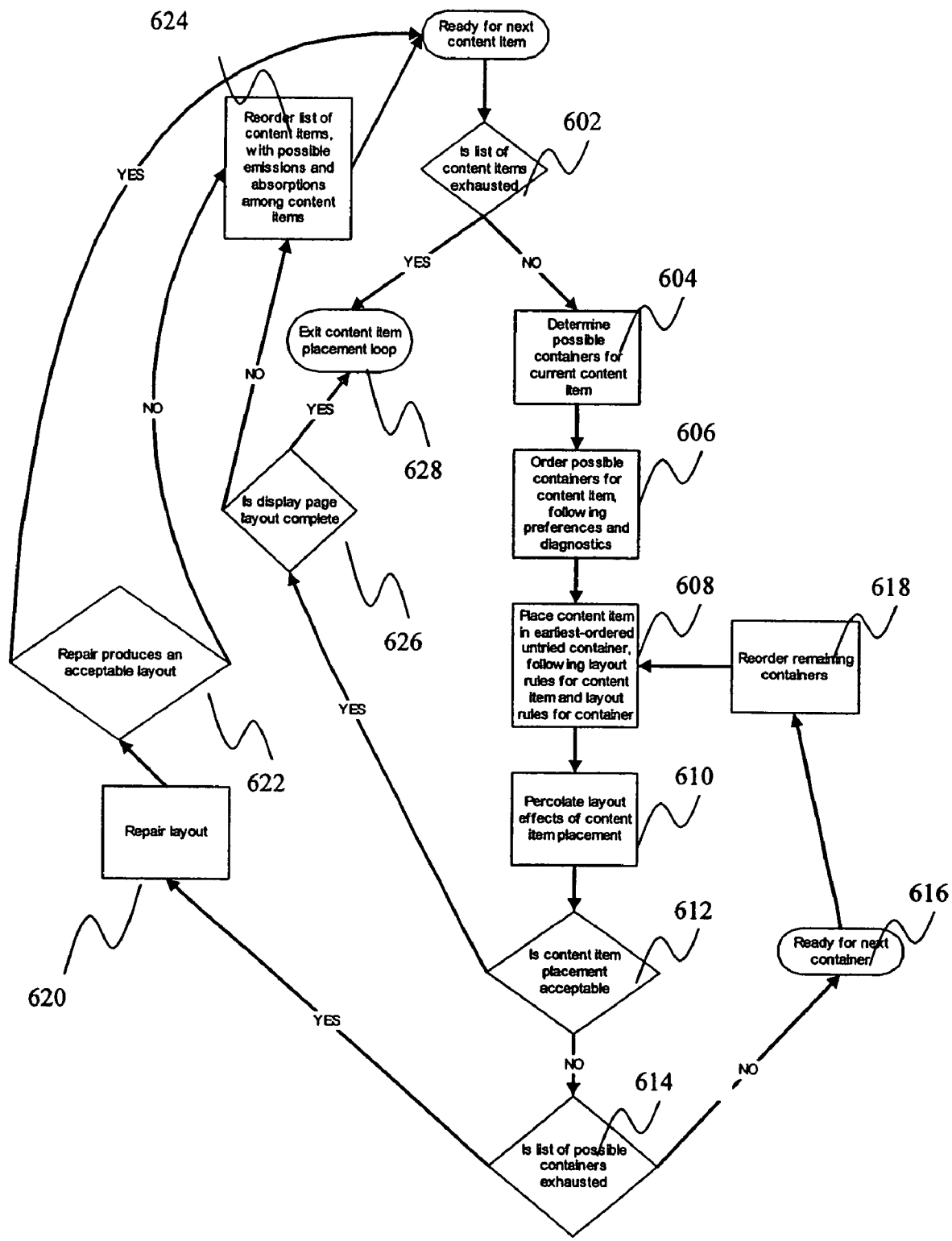

FIGS. 4-6 depict selected operations of layout generator 312, in accordance with various embodiments. In various embodiments, the layout generator 312 is executed as a single thread to execute operations as follows: identify the content items to be placed 402, order the content items 406, and lay out the content items in a set of linearly ordered display pages 408. In various embodiments, for each display page, layout generator 312 places the content items on the display page according to the ordering of the set of content items 502-506. For each content item to be placed 602, layout generator 312 identifies the possible containers for the content item 604, order the containers, 606 and try placing the content item in the containers in order 608-618.

Content item placement may involve adjustments to the content item itself 624, or to the container in which the content item is placed 610. Layout adjustments may percolate through the page 610. For example, an intermediate container may be created between the content item and the previously existing container, or the content item may convert from absolute to percentage sizing, or the content item may receive a border treatment. In this embodiment, placement of a single flow across multiple display pages entails maintaining a cursor within the flow, so that successive displayable sub-flows are assigned to successive display pages. When the placement of a content item in a container is acceptable 612 (and the display page layout is complete 626), or if the sequence of containers is exhausted 614, layout generator 312 proceeds to the next content item.

Thus, for these embodiments, the operations of layout generator 312 may be considered as a nested loop with three levels: a display page loop (FIG. 5) contains a content item placement loop (FIG. 6) that contains a container placement loop (604-618). If the placement of a content item in a container results in a display page layout that is deemed complete 626, then both the content item placement loop and the container placement loop are exited immediately 628.

Various criteria for ordering content items are possible. For example, content items may be ordered based on their values, such as ordering advertisements so that higher-priced advertisements are placed first. Various criteria for ordering containers are possible. For example, display containers may be ordered based on their remaining content item holding capacity, such as ordering tables with unfilled cells before tables without unfilled cells.

Various criteria for determining acceptable placements are possible. For example, if the placement of a content item in a container results in a layout that fits in the display region, so that no scrolling is required to view the entire layout, then that may be sufficient for the placement may be deemed acceptable. It might be required in addition that the layout of each display page satisfy criteria of consistency with the layouts of previous display pages. Various criteria for deeming a display page layout complete are possible. For example, if the percentage by area of blank space is below a stipulated threshold, the layout may be deemed complete. Criteria for display page layout completeness may reflect processing history, so that depending on how layout has progressed, a layout that falls short of perfection by some criteria is nevertheless deemed complete.

Various criteria are possible for deeming that the sequence of display pages is complete. For example, if each successive display page includes a successive portion of a particular flow, the sequence of display pages may be deemed complete when the end of the flow has been assigned to a display page.

In other embodiments, the innermost loop is not exited when an acceptable placement of a content item in a container is found. Instead, the inner loop tries all placements of the content item at hand in candidate containers, compares the placements according to an objective function, and finally places the content item in the preferred container.

Other embodiments support layouts where content is not presented in display pages. If it isn't possible for all content items to be visible in the designated display region at the same time, the display region is equipped with a scrolling mechanism. Scrolling may be vertical, or horizontal, or both vertical and horizontal. In the embodiments that support scrolled presentations, the display page loop (FIG. 5) is omitted.

Thus in various embodiments, the operations of layout generator 312 are executed as a single thread as follows: identify the content items to be placed 402, order the content item 406, and place the content items in the display region according to the ordering of the set of content items (replacing 408 of FIG. 4).

These alternate embodiments correspond to the embodiments described in the preceding paragraphs, except that (1) the outer display page loop (408 and FIG. 5) is omitted, so that the operations of layout generator 312 comprise a nested loop with two levels, (2) flow content items are placed in the display region in their entireties, (3) criteria for acceptable placement of content items may require that scrolling remains limited to one dimension, but may not require the complete avoidance of scrolling, and (4) layout is deemed complete when all content items have been placed in the display region. If scrolling is limited to one dimension, one of the criteria for acceptable placement of content items is that all content items must visible in the display region without introducing scrolling in the second dimension.

In some embodiments, layout generator 312 allows reordering of the sequence of content items as the outer loop is executed. For example, if there has been a failed attempt to place a content item on a display page, the content item may be assigned a new position within the list of content items, so that the content item is available for placement on another display page. In a second example variant, compatible with the first example, additional content items may be under consideration because of the activity of a separate, concurrently running thread that downloads content from one or more Web server sites. In a third example variant, compatible with the first two examples, if content items are allowed to appear on multiple display pages, content item ordering may reflect the appearance histories of content items, so that once a content item appears on a display page, it remains in the ordered list of content items, but is moved to a position farther from the beginning of the list. In a fourth example variant, compatible with the first three examples, suppose that the display page layout in progress includes blank space that can perfectly accommodate a content item that's not at the beginning of the sequence of unplaced content items, while all the content items that appear earlier in the sequence are too big to fit anywhere on the page. In this case, the content item that can be accommodated in the blank space is moved to the beginning of the sequence of unplaced content items.

Content item reordering may involve the emission and absorption of content items. A content item may emit a constituent that becomes a content item to be placed in the list of content items. For example, a content item corresponding to a flow of text and images may emit an image that becomes a content item to be placed outside the region dedicated to the flow. Or a flow may emit a flow, as when a flow of text and images emits its images as a new flow. Conversely, a content item may absorb another content item, so that the absorbed content item is removed from the list of content items to be placed. For example, a flow of text and images may absorb an advertisement, with the result that the advertisement appears inside the region dedicated to the flow. Determination of emissions and absorptions may be sensitive to layout progress. For example, if a text flow can absorb an advertisement without compromising readability, and if layout has progressed to a point where the advertisement can't be fit outside the text flow, then it may be determined that the text flow will absorb the advertisement.

Similarly, in yet other embodiments, layout generator 312 allows the reordering of the sequence of containers as the inner loop is executed. For example, if the content item to be placed has a larger area than can be accommodated by the container at the beginning of the sequence of untried containers, then that container may be deleted from the sequence of candidate containers.

In still other embodiments, the relationship between the outer content item loop and the inner container loop of operations of layout generator 312 is reversed—the outer loop drives through containers, while the inner loop drives through content items that are candidates for placement in the container at hand. Because a container may include multiple content items, a single pass through the outer loop may accomplish multiple placements. These embodiments are well-suited to situations where maintenance of layout geometry is of prime importance, as when it's desired to have a consistent geometry across display pages. As with the embodiments where the outer loop drives through content items and the inner loop drives through containers, both the sequence of content items and the sequence of containers may be reordered as layout proceeds.

Beyond this, in still other embodiments, the outer loop may drive through a sequence that includes both content items and containers, where the sequence may be reordered with each pass, where elements may be deleted from the sequence with each pass, and where new elements may be inserted into the sequence with each pass. For a pass over the outer loop that attempts to place a content item, the inner loop is a pass over containers. For a pass over the outer loop that attempts to fill a container, the inner loop is a pass over content items. The inner loop sequence may be determined dynamically, before the first inner loop pass for a given outer loop pass, and also before each subsequent inner loop pass for that outer loop pass. Given that a pass through the outer loop attempts one or more placements involving a container, some passes of the inner loop may attempt placements into the container, and some passes of the inner loop may attempt to place the container into a higher container, so that the inner loop sequence is a mix of higher and lower display entities. Embodiments with mixed loop sequences are well-suited to situations like the following: placement of high priority content item I is of prime importance, so I becomes the first element in the outer loop sequence, and I is placed in container C; once C has one filler, it becomes of prime importance that C has a second filler for visual balance, and C becomes the second element in the outer loop sequence.

In the embodiments described so far, only containers that directly contain content items appear in loop sequences, and higher containers (containers that contain other containers) are placed eagerly as lower containers require them. In other embodiments, higher containers may appear in loop sequences. For example, consistency requirements may make it important for a particular higher container to appear with minimum total area of included display units. Containers in a completed layout form a hierarchy with the display units corresponding to content items as terminal elements. This hierarchy may be constructed top-down or bottom-up, depth-first or breadth-first. Or higher containers may be candidates for inclusion in the outer loop sequence, where the membership of this outer loop sequence and its ordering are determined dynamically as described above. In such embodiments, when a container C (whether a higher container or not) is the subject of a pass through the outer loop, the inner loop might include candidates for placement inside C, or it might include candidate parents for C in the container hierarchy. In some embodiments, the inner loop sequence might change during C's outer loop pass, in such a way that for some inner loop passes, candidate children of C are under consideration, while for other inner loop passes, candidate parents of C are under consideration.

In addition, in still other embodiments, the operations of layout generator 312 may include layout repair operations 620-622. In an embodiment where the outer loop drives through content items and the inner loop drives through containers, the repair operation 622 may occur within the inner placement loop. If no candidate containers can accommodate the content item to be placed, given the placement decisions made for preceding content items, then items already placed may be rearranged, effectively changing the earlier placement decisions. In other embodiments, layout repair steps may occur within the inner loop, or within the outer loop but outside the inner loop. Repairs may be generated efficiently through diagnosis of layout problems. It should be emphasized that layout repair does not involve backtracking. It applies directly to a layout in its current state.

Initial and subsequent formulations of outer and inner loop sequences, as well as layout repair, may include a variety of diagnostics 410 as input. Content items may be measured. It may be advantageous to measure a content item multiple times, for example determining the content item's height at a range of sample widths. In the interest of efficiency, estimates may replace actual measurements. For example, the area to be occupied by a run of text with a uniform font may be estimated based on the font and the length of the text. Another example of diagnostic is to determine which containers include blank space, by comparing a container's measured area with the sum of the areas of its constituent content items. Containers with large amounts of blank area may be favored candidates for receiving additional content items. Another example of a diagnostic is to determine which sets of containers contribute to making a layout exceed a stipulated limit for a given dimension. Containers that contribute to excess width or height may be favored candidates for giving up content items during a layout repair operation.

In still other embodiments, threaded versions of variants of layout generator 312 can offer performance advantages. For example, as the main thread executes the basic nested loop, diagnostics 410 can run on one or more separate threads, taking into account the progress of the main thread. Other threads can reorder content items and can reorder containers, taking into account the progress of the main thread and the results of diagnostic threads. The innermost loop's work of making placements in containers, and percolating the layout effects of these placements, can be allocated to multiple threads 412, with the effects of placement decisions in different containers, possibly including subsequent repairs, reported to a thread that makes placement decisions. Other threads can download new content, supplying additional content items as input to a thread that reorders content items. As the main thread works on one display page, other threads can undertake preparatory work for subsequent display pages. In FIG. 4, the solid line indicates the only thread in single-threaded embodiments, and indicates the main thread in an example of threaded embodiments. The dashed lines indicate subsidiary threads running at lower priorities.

In a layout that exhibits world-within recursion, each node in the world-within hierarchy has its own container hierarchy. Each node in the world-within hierarchy is subject to layout according to the embodiments described above, possibly including embodiments that present content in display pages. Layout decisions made at the level of a parent node in the world-within hierarchy affect possible layouts for the parent's child nodes, and vice-versa. For example, layout decisions made at the parent level may introduce size constraints to child layouts, and layout decisions made at the child level may determine the sizes and shapes of the display units to be arranged at the parent level. Global layout results will depend on the order in which layout results are committed for nodes in the world-within hierarchy. Diagnostics for layouts that exhibit world-within recursion may estimate possible shapes and sizes of layouts for lower nodes. In some embodiments, estimated shapes and sizes for nodes at the lowest level of the world-within hierarchy are used to estimate shapes and sizes for nodes at the next higher level, and so on. At the top level of the world-within hierarchy, estimates of shapes and sizes at the next lower level are used to calculate the layout of the top level according to embodiments in the paragraphs above. With the outer shapes and sizes of layouts for nodes at the next lower level now fixed, final layouts at the next lower level are calculated according to embodiments in the paragraphs above. Layout proceeds in this fashion down through the world-within hierarchy until all nodes have been laid out. In cases where layout for a child node cannot be completed acceptably, given the outer size and shape for the child node layout that's established in the parent node layout, parent node layout may be repaired directly, with repairs continuing up the world-within hierarchy as required. Layout repair for a parent node proceeds after layout is complete for all child nodes. (Layout estimation for sibling nodes in the world-within hierarchy may be allocated to separate threads, and similarly for layout and layout repair.) Thus in these embodiments, layout estimation proceeds bottom-up, then layout based on layout estimates proceeds top-down, then layout repair proceeds bottom-up. In other embodiments, layout may proceed bottom-up without any layout estimation steps, may proceed top-down without any layout estimation steps, and so on.

Two-dimensional layout of text and graphics may be decomposed into two sub-problems, which may be called "flow layout" and "size, shape, and position layout." "Size, shape, and position layout" may be abbreviated as "SSP layout." Flow layout involves placing text characters in lines, positioning text lines in columns, positioning images in surrounding text, and so on. The present invention concerns SSP layout. Its various embodiments determine the size, shape, and position of display units in a display presentation. Even in its simple manifestations, the SSP layout problem is exponential, in the sense that the solution space its exponential in the number of display units to be laid out. Evaluating all possible solutions is thus impractical. In designing algorithms for the SSP layout problem, there's a tension between efficiency requirements and layout quality requirements. Following what may be referred to as the search approach, prior art includes a great variety of algorithms and heuristics for coping with exponential solution spaces, and includes some applications of these algorithms and heuristics to versions of the SSP layout problem. Some of these prior art applications exhibit unacceptable efficiency, in the worst case or even in the average case. More typically, they solve impractically restricted instances of the SSP problem, or they produce poor quality results with unacceptable frequency. Prior art also includes instances of a very different approach to SSP layout, where layout proceeds deterministically, or proceeds deterministically with limited backtracking. The principal shared disadvantage of prior art deterministic approaches is that they produce poor quality layouts in many cases. The various embodiments of the present invention address the requirement of producing high quality results for a very wide range of problem instances. This requirement is a principal motivation for the search approach. The various embodiments of the present invention also address requirements of efficiency, which are a principal motivation of the deterministic approach. The various embodiments of the present invention proceed for the most part in a deterministic fashion. With strictly limited exceptions, there's no search across layout alternatives. Moreover, execution doesn't backtrack. Instead, any required repair applies directly to results as they stand when the need for repair is detected. Recall that execution proceeds in three nested loops, with the outermost paging loop used only for paged presentations. The other two loops may be referred to as the outer loop and the inner loop. Recall further that in some embodiments, both the outer loop sequence and the inner loop sequence may be reconstituted dynamically as execution proceeds. This reconstitution may take into account the layout results that are in place at the time that the reconstitution occurs, and may also take into account the full range of layout desiderata that a search-based algorithm might incorporate in its objective function.

Thus, to summarize, the core of the operations of layout generator 312 can be thought of as formation of a valid inner-outer display entity pair, and a determination is made to accept or reject placement of the inner display entity into the outer display entity. The outer display entity may be a display container, whereas the inner display entity may be another display container or a content item. Depends on the embodiments, either the outer or the inner display entity may be selected first. The process is repeated with or without switching the order of inner/outer display entity selection, and ordering/reordering of content items and/or display containers, modifications of content items and/or display containers, as well repair and diagnostics are optionally performed, as necessary.

Figure 7:
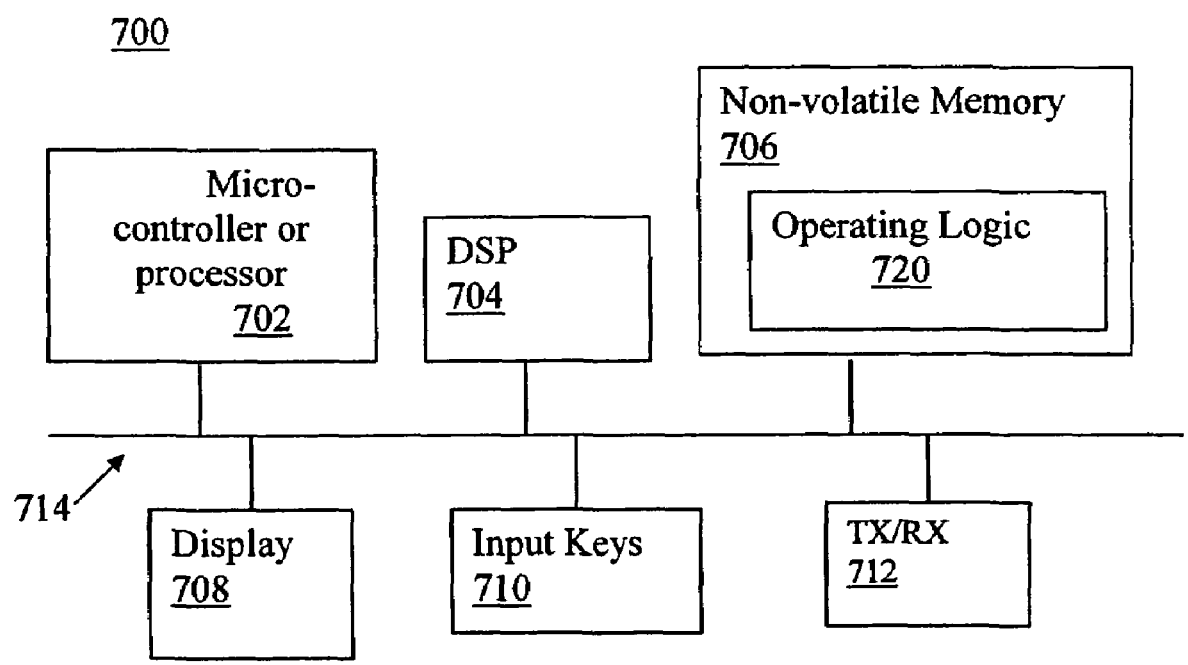
FIG. 7 illustrates an example computer system, suitable for use to facilitate practice of the present invention, in accordance with various embodiments.

FIG. 7 illustrates an architecture view of a computing device 700, such as a desktop computer or a PDA, suitable for practicing the present invention in accordance with one embodiment. Computing device 700 may be a server or a client. Whether as a server or client, computing device 700 may be coupled to clients or server via a wireless or wireline based interconnection, over one or more private and/or public networks, including the famous public network "Internet".

As illustrated, for the embodiment, computing device 700 includes elements found in conventional computing device, such as micro-controller/processor 702, digital signal processor (DSP) 704, non-volatile memory 706, display 708, input keys 710 (such as keypad, select button, D-unit), and transmit/receive (TX/RX) 712, coupled to each other via bus 714, which may be a single bus or an hierarchy of bridged buses. Further, non-volatile memory 706 includes operating logic 720 adapted to implement the earlier described layout generator 312, layout interpreter 315 and/or render engine 316, in and of itself/themselves or as part of one or more larger components. The implementation may be via any one of a number programming languages, assembly, C, and so forth.

In alternate embodiments, all or portions of the operating logic 720 maybe implemented in hardware, firmware, or combination thereof. Hardware implementations may be in the form of application specific integrated circuit (ASIC), reconfigured reconfigurable circuits (such as Field Programming Field Array (FPGA)), and so forth.

Figure 8A:
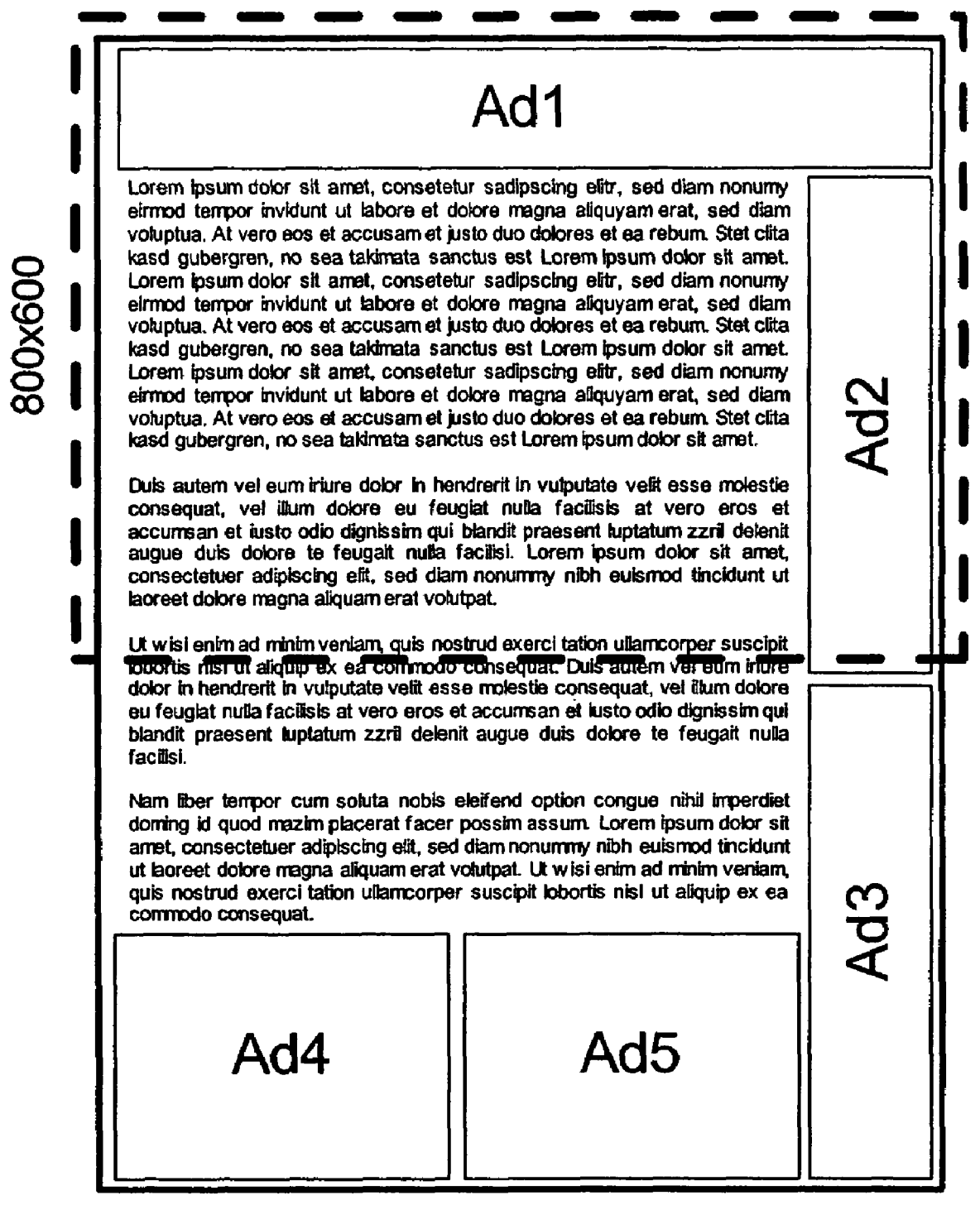
Figure 8B:
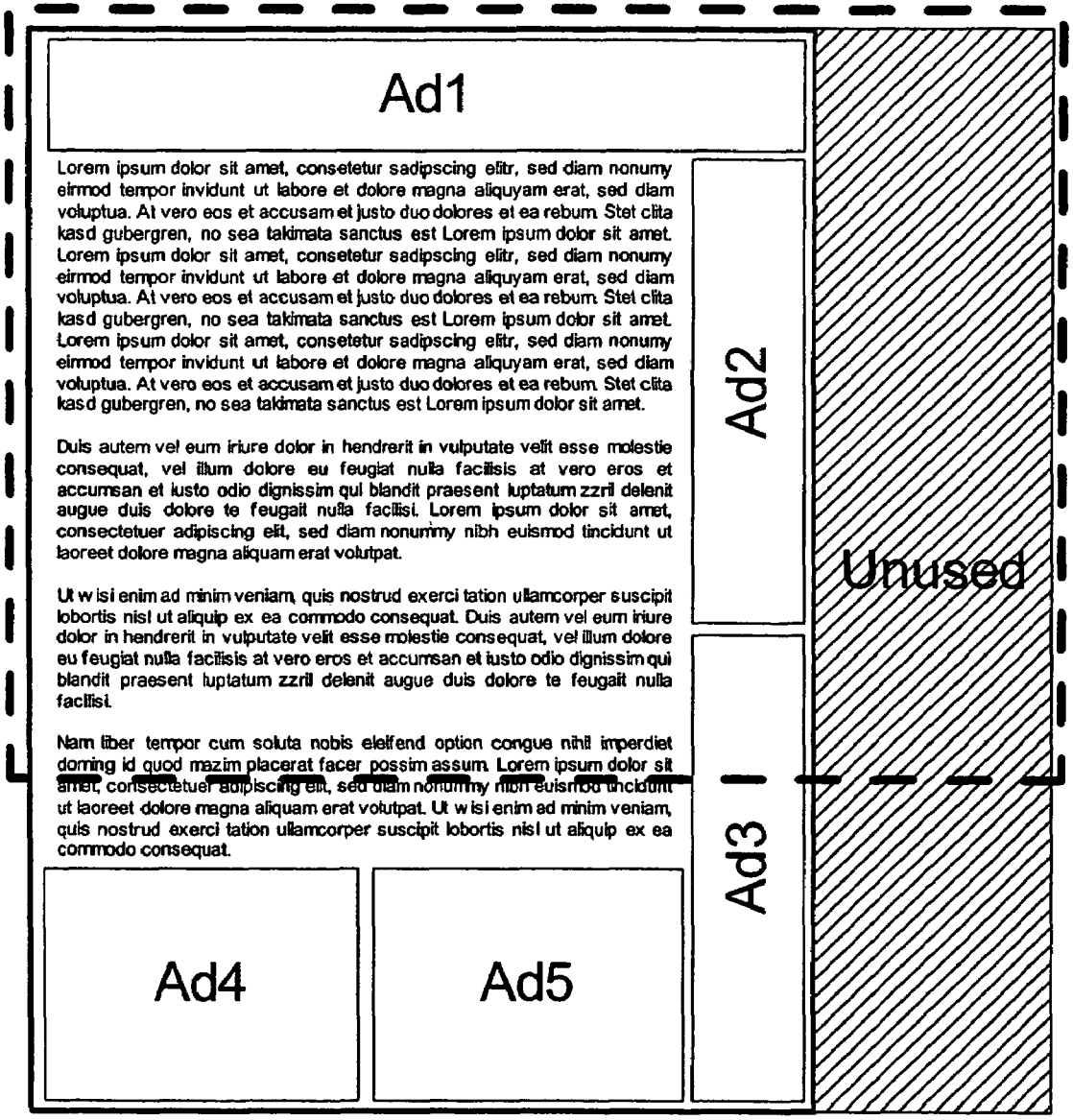
Figure 8C:
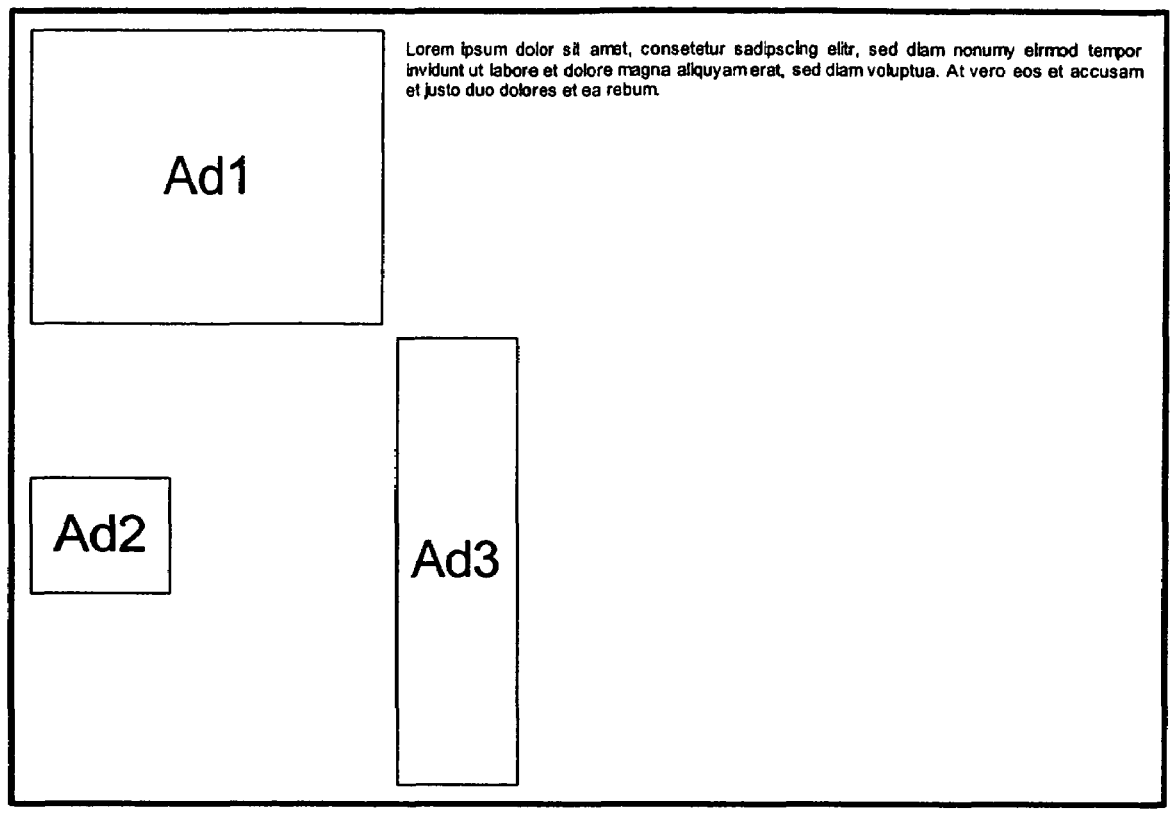

FIGS. 8*a*-8*c* illustrate a first example problem the present invention may be applied to address, which is to permit full use of the available areas of computer display windows.

Currently, computer systems may fail to take full advantage of the available area of display windows to display information. For example, Web sites cannot take full advantage of available area of client browser windows to display advertisements. Client browser windows use a variety of screen resolutions and window sizes. Web pages may be authored using small fixed widths, so that the majority of clients can view the pages without horizontal scrolling, as illustrated in FIG. 8a. But then clients with larger displays have unused real estate, as illustrated in FIG. 8b.

HTML and CSS allow Web pages to be authored with percent widths. An HTML/CSS Web page can stretch to fit large client display widths. However, layouts with percent widths can generate internal wasted real estate, as illustrated in FIG. 8c. Even if no real estate is wasted, percent widths do nothing to use increased real estate for additional information display.

Figure 9A:
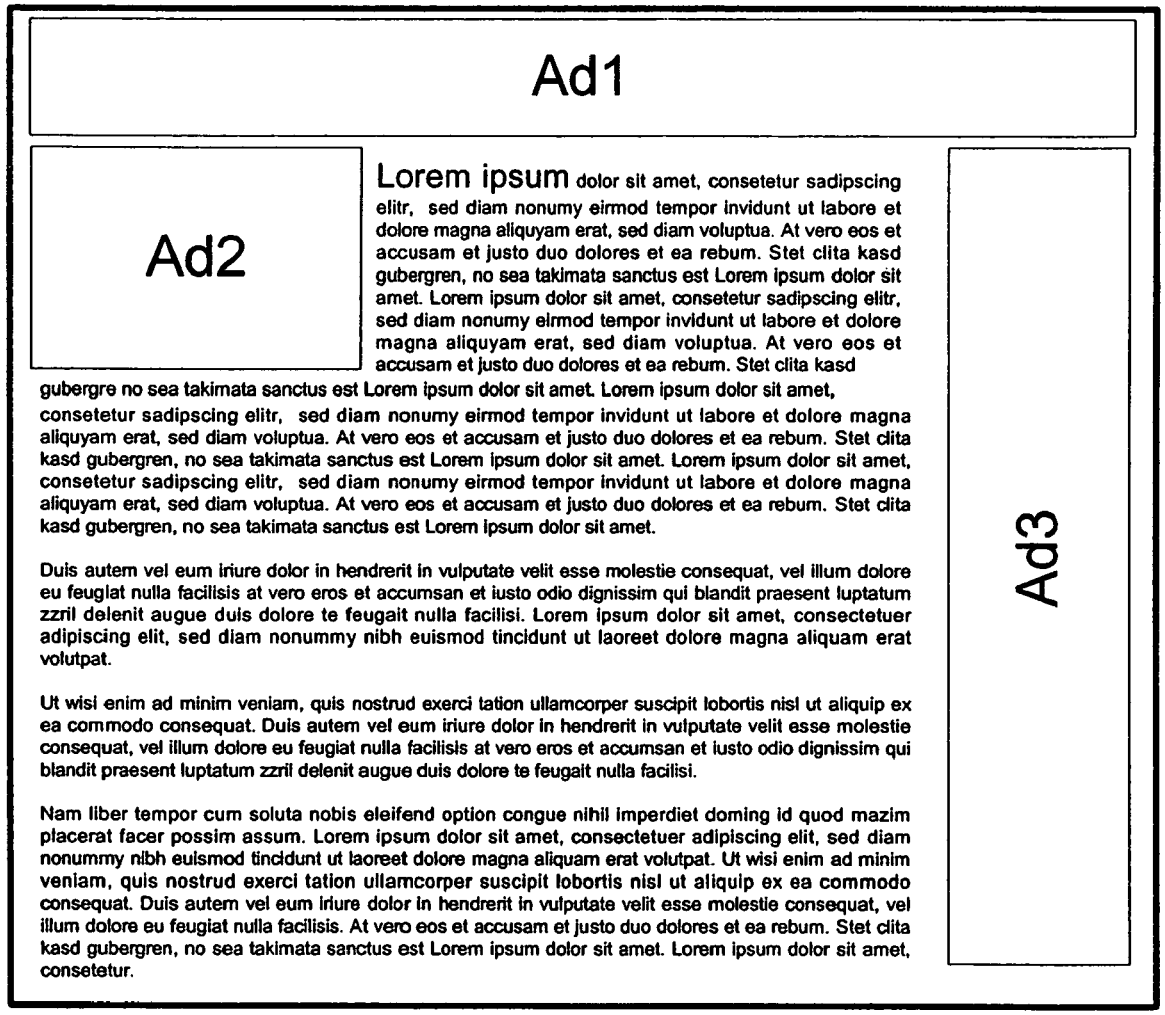
FIGS. 9a-9c illustrate an example application of the present invention to accommodate display items of different sizes within computer display windows.
Figure 9B:
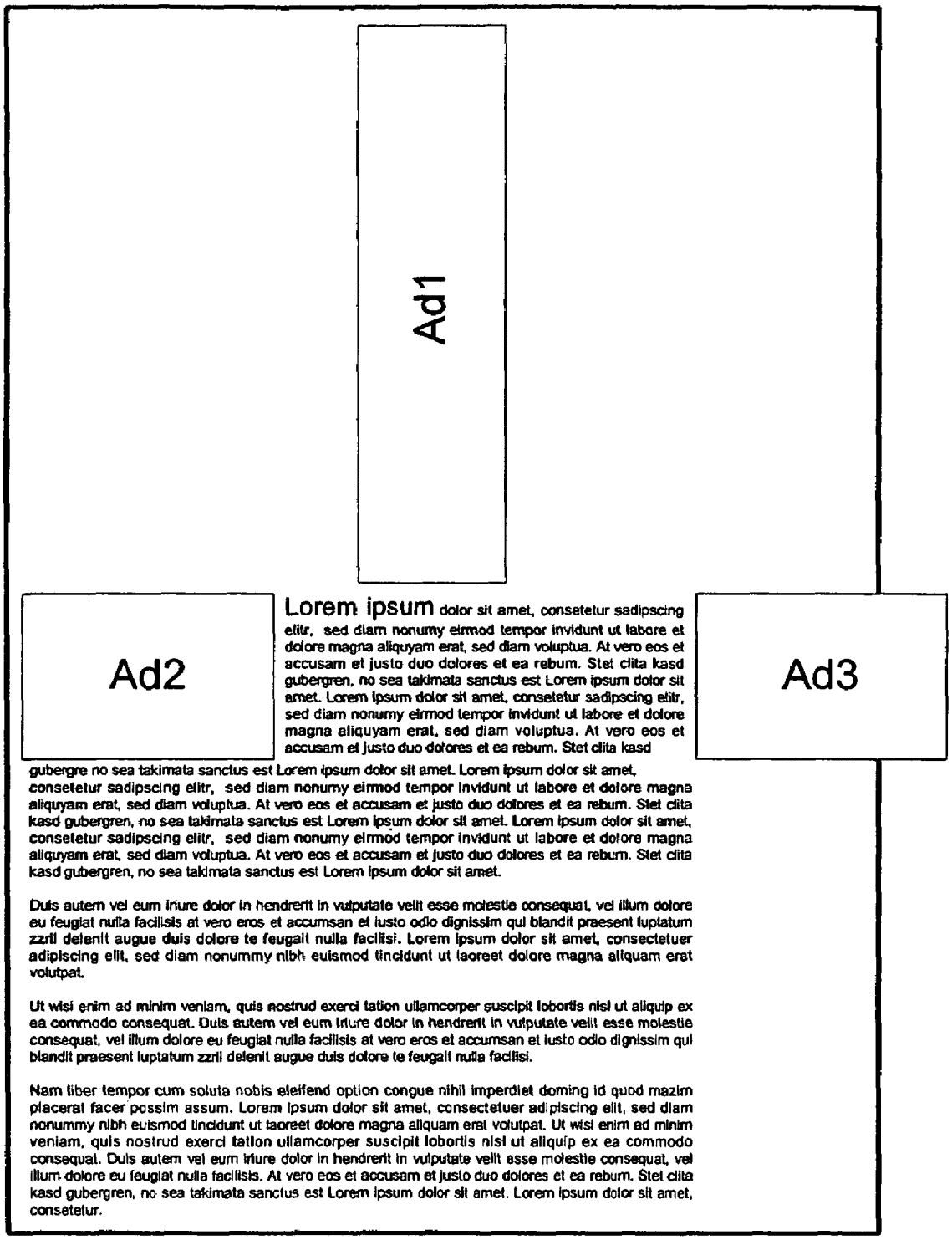
Figure 9C:
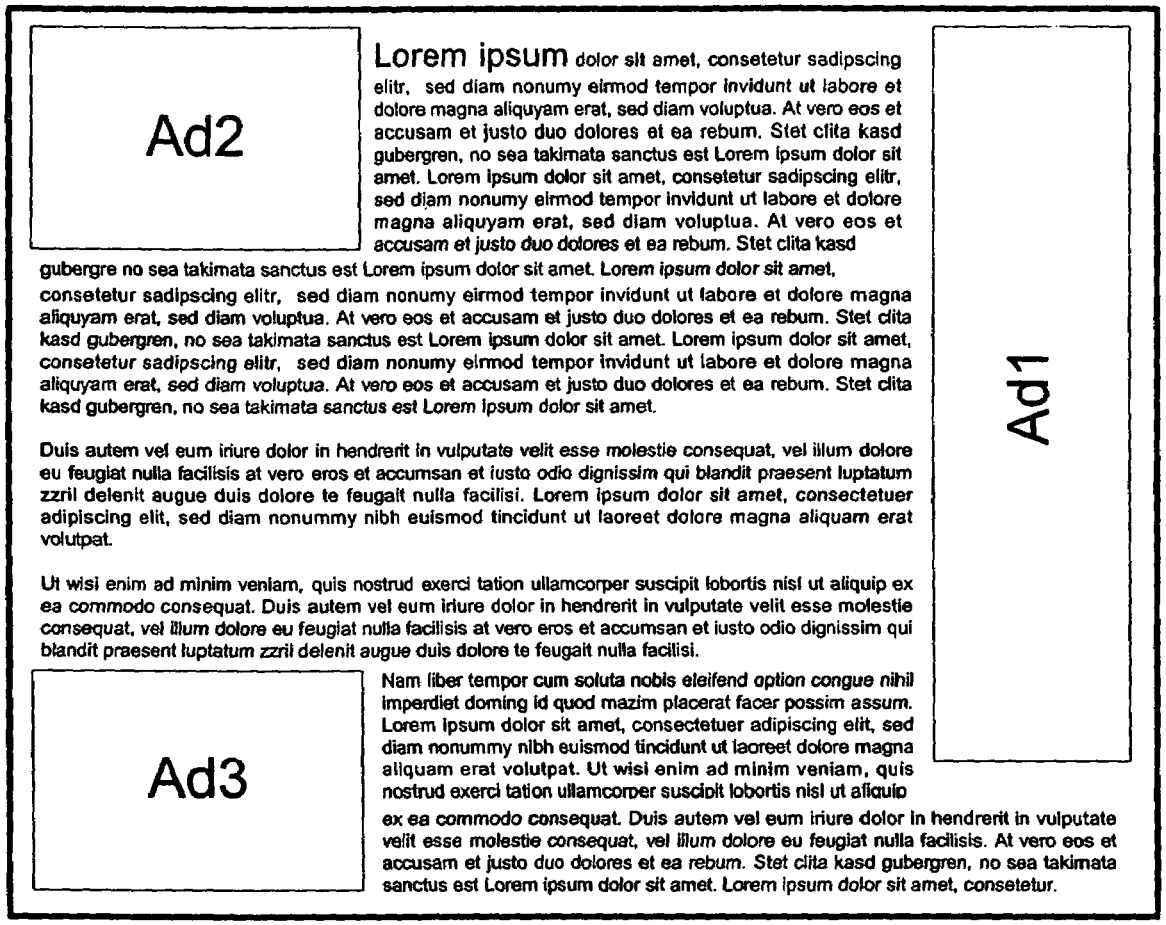

FIGS. 9a-9c illustrate a second example application of the present invention to accommodate display items of different sizes within computer display windows.

FIG. 9a illustrates a prior art Web page with three advertisements.

FIG. 9b illustrates a prior art Web page with severe layout problems resulting from substituting the advertisements in FIG. 9a with advertisements of different dimensions.

FIG. 9c illustrates how the present invention can accommodate the same substitutions shown in FIG. 9b, in various embodiments.

FIGS. 10a-10f illustrate a third example application of the present invention to permit information display in computer display windows without scrolling.

Figure 10A:
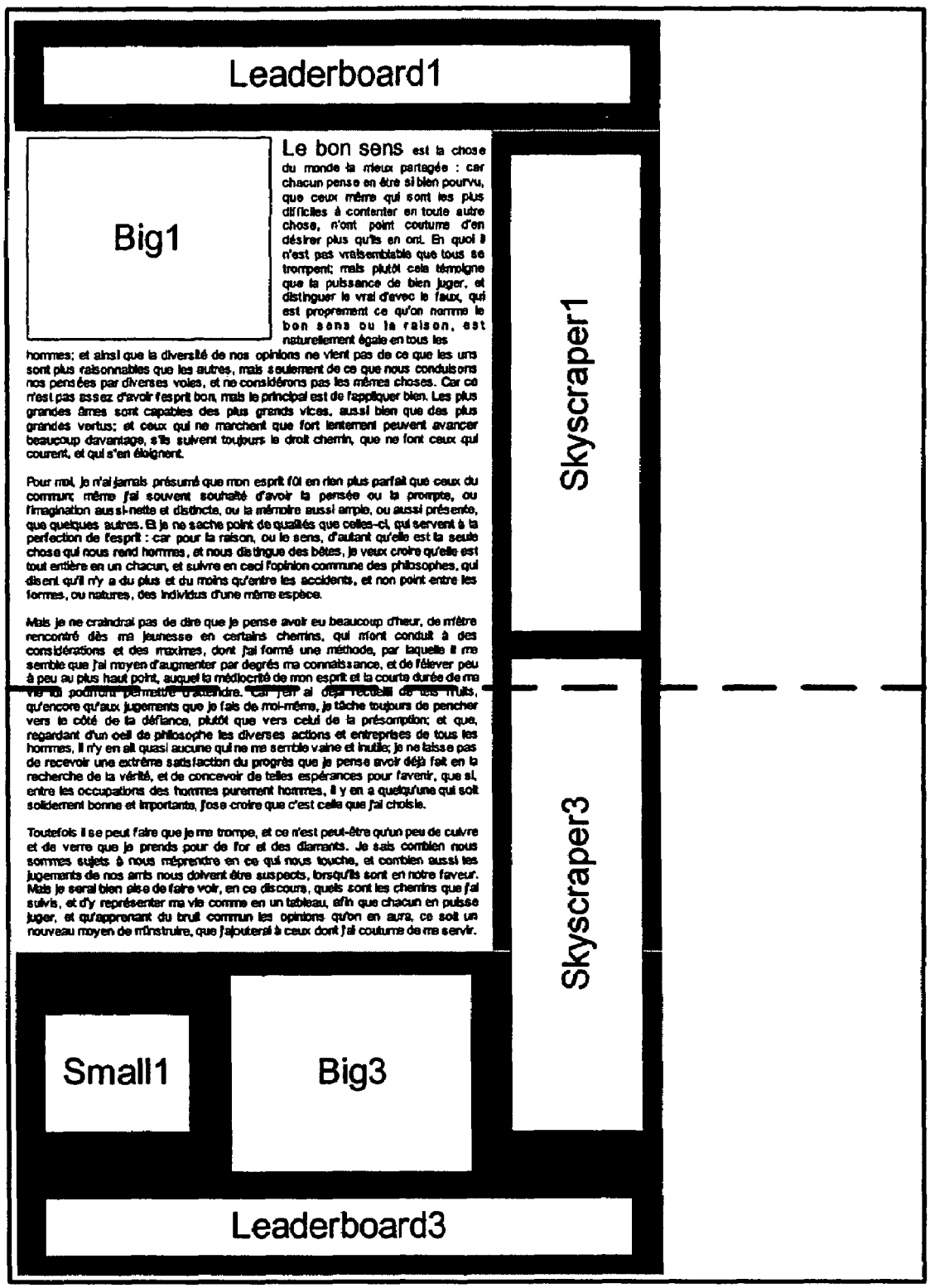
FIGS. 10a-10f illustrate an example application of the present invention to permit information display in computer display windows without scrolling.
Figure 10B:
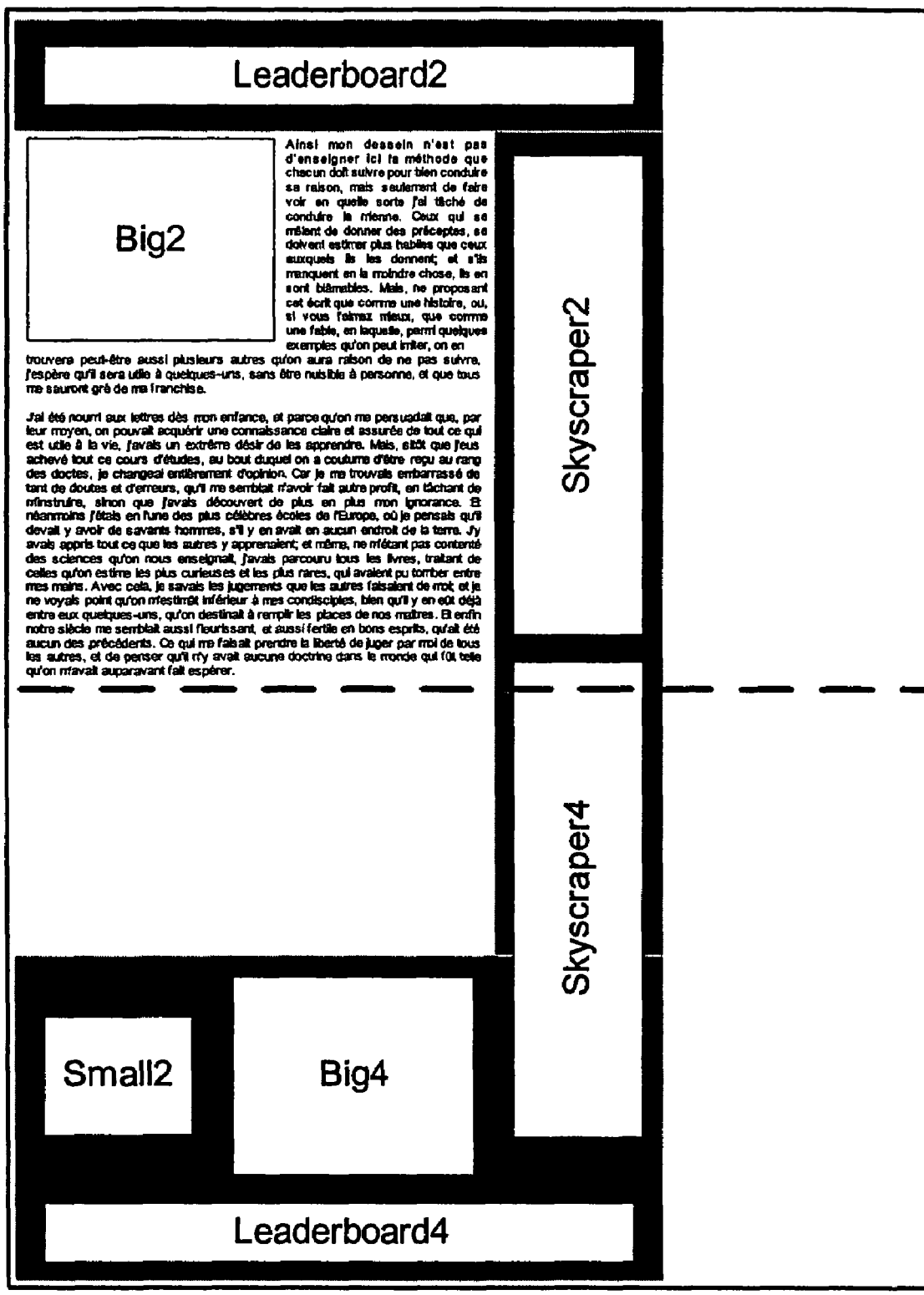
Figure 10C:
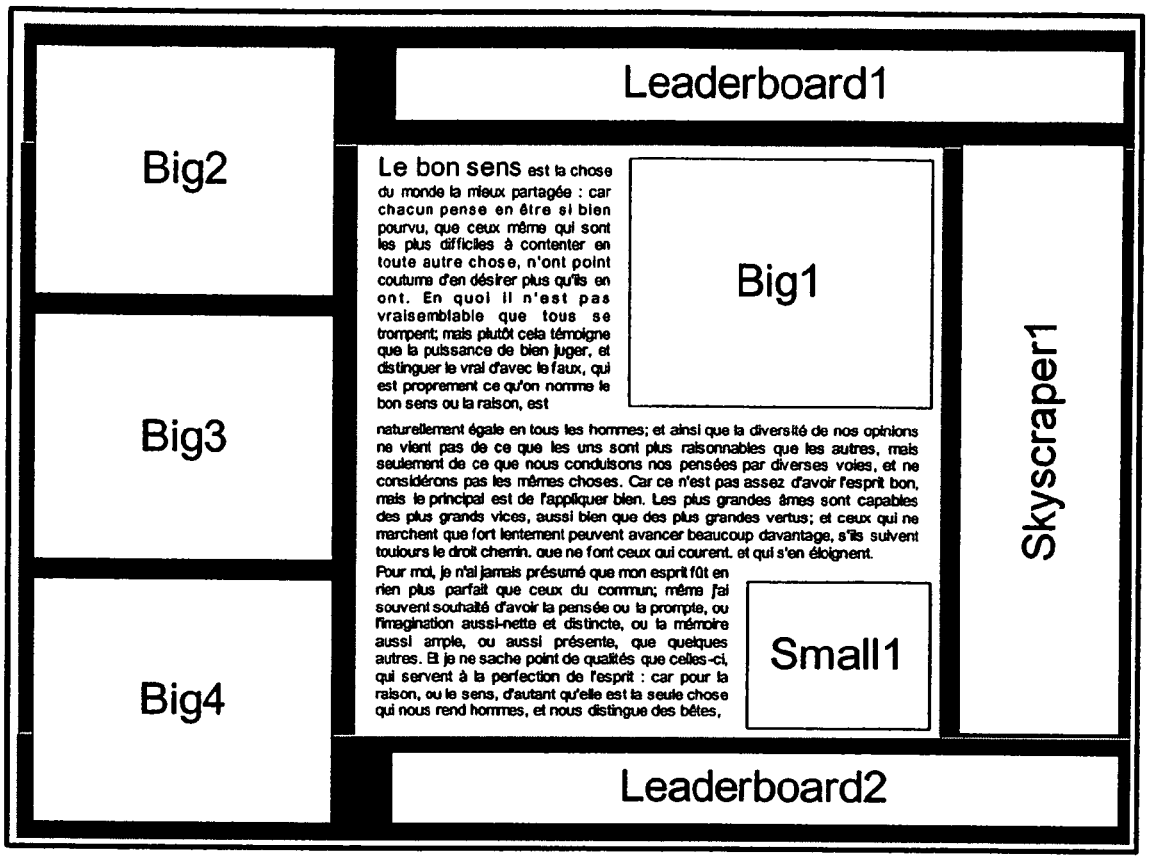
Figure 10D:
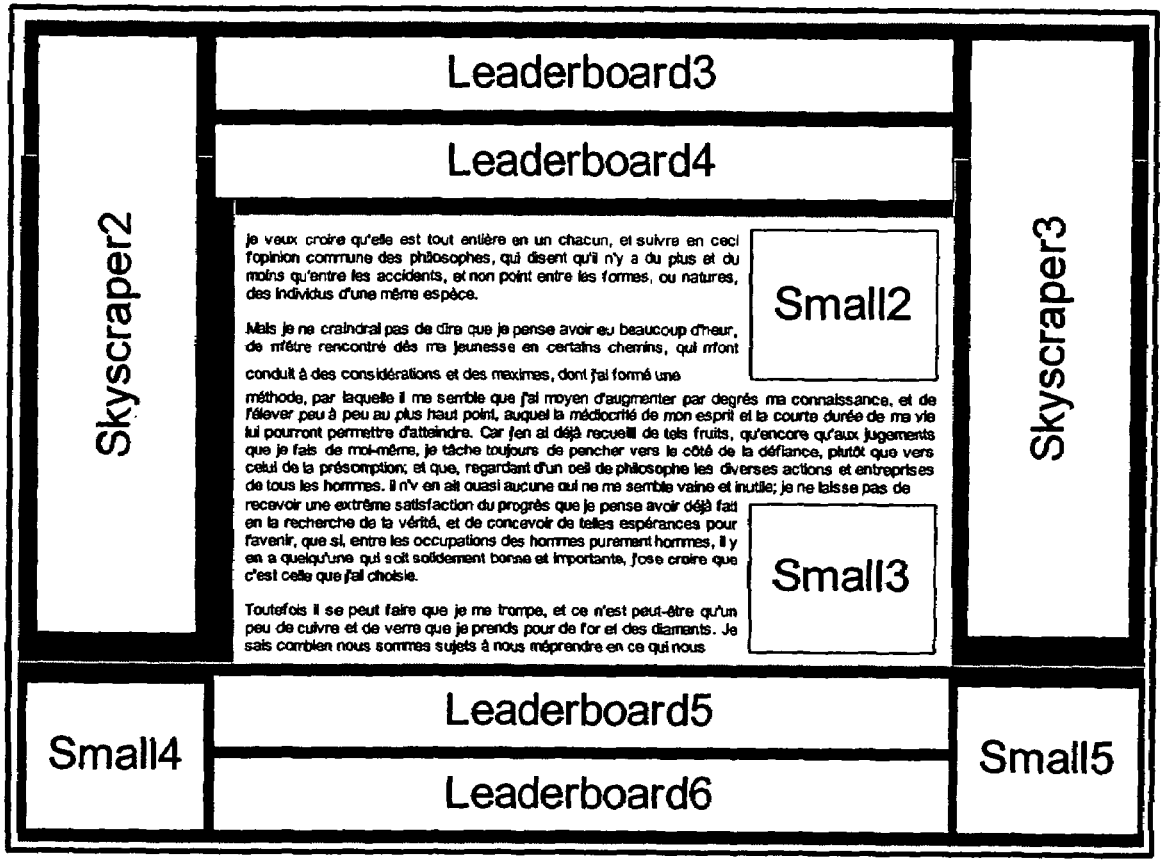
Figure 10E:
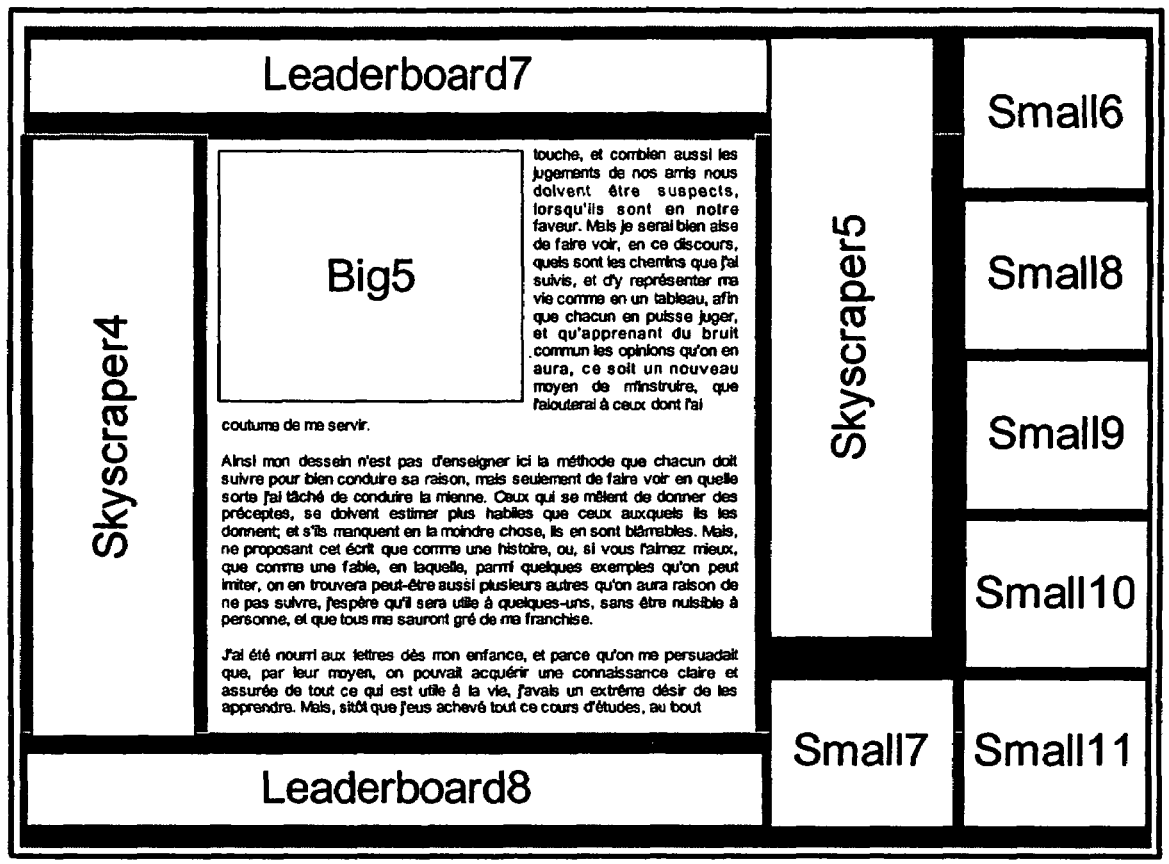
Figure 10F:
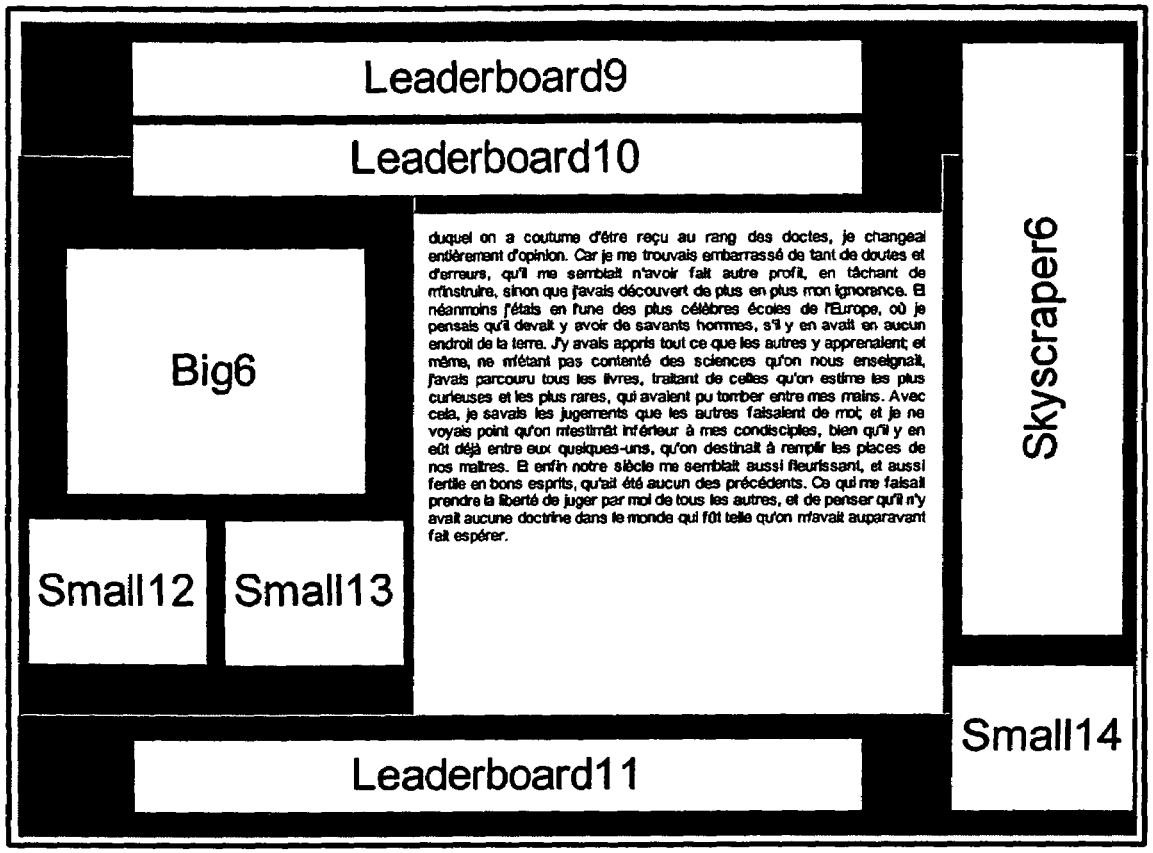

FIGS. 10a and 10b illustrate a Web-based newspaper article with advertisements, presented according to prior art. (The illustrative text is selected from *Discours de la Méthode*, by Descartes, rather than from an actual or made-up news article.) The article is spread across two Web pages with fixed width and height. The two Web pages have identical layouts, although they contain different advertisements. The browser window is wider and shorter than the Web page layout. In both FIG. 10a and FIG. 10b, the dashed line indicates the bottom of the browser window. The total number of advertisements displayed in the two Web pages is 14. However, only 6 of the advertisements appear entirely above the fold in the browser window. The user can read the entire article without bringing any of the remaining 8 advertisements into complete view.

FIGS. 10c-10f illustrate one way in which the same newspaper article may be laid out according to the present invention. The article is spread across four Web pages, each of which has height and width corresponding to the height and width of the display window. The layouts of the four Web pages are different from each other. These layouts have been generated in response to the publisher's advertising display requirements, which may be sensitive to factors such as advertisement pricing and user targeting, and which may include preferences such as the placement of higher-priced and more-specifically-targeted advertisements closer to the beginning of the article. Advertising display requirements are reflected not only in the selection of advertisements, but also in the positions the selected advertisements take within the initial ordering of content items. FIGS. 10c-10f illustrate possible results when a publisher prefers to have more advertisements with smaller dimensions, rather than fewer advertisements with larger dimensions. The total number of advertisements that appear in the four Web pages is 37, all of which appear above the fold. It may be emphasized that this is a single illustration of the the present invention applied to the presentation of a Web-based newspaper article in a browser window. Different users, with different browser display parameters and different targeting profiles, can be served very different selections of advertisement sizes, because the advertisements aren't constrained to fit in fixed-size slots within fixed layouts. Basic layout requirements will vary from publisher to publisher. Advertising display requirements will likewise vary from publisher to publisher.

The above are just examples and not exhaustive of all possible applications of embodiments of the present invention.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A processor implemented method for automated layout of a plurality of content items, comprising:
   forming by a layout generator operated by a processor, an inner-outer display entity pair having an inner display entity and an outer display entity, the outer display entity being a display container, and the inner display entity being a selected one of one of said content items and another display container;
   accepting or rejecting placement by the layout generator of the inner display entity into the outer display entity based at least in part on one or more layout placement criteria; and
   repeating said forming and said accepting or rejecting at least one other time if layout of the content items is incomplete and another inner-outer display entity pair can be formed.

2. The method of claim 1, wherein said forming comprises the layout generator selecting the outer display entity, followed by the layout generator selecting the inner display entity.

3. The method of claim 1, wherein said forming comprises the layout generator selecting the inner display entity, followed by the layout generator selecting the outer display entity.

4. The method of claim 1, wherein said forming comprises the layout generator selecting a display container, followed by the layout generator selecting another display container to contain or be contained by the earlier selected display container.

5. The method of claim 1, wherein said forming comprises the layout generator first selecting a selected one of the inner display entity or the outer display entity by an outer execution loop, followed by selecting the other of the inner and outer display entities by an inner execution loop looping within the outer execution loop.

6. The method of claim 1, wherein said forming comprises the layout generator first selecting a selected one of the inner display entity or the outer display entity by an inner execution loop, and then selecting the other of the inner and outer display entities by an outer execution loop looping outside of the inner execution loop.

7. The method of claim 1, wherein said one or more layout placement criteria include at least one of:
   a criterion associated with whether scrolling is required for a content item to be placed in a display container, when the inner-outer pair is a content item-display container pair, a criterion associated with placement of subconstituents of a content item, when the inner-outer pair is a content item-display container pair, a criterion associated with display space utilization, and a criterion associated with display aesthetics.

8. The method of claim 1, wherein said repeating comprises the layout generator, on rejecting the placement of the inner display entity in the outer display entity, forming another inner-outer display entity pair by replacing one of the display entities of the rejected inner-outer display entity pair, and accepting or rejecting placement of the inner display entity of the another inner-outer display entity pair into the outer display entity of the another inner-outer display entity pair based at least in part on one or more layout placement criteria.

9. The method of claim 8, wherein said replacing comprises the layout generator selecting another inner display entity to form the another inner-outer display entity pair with the outer display entity of the rejected inner-outer display entity pair, or selecting another outer display entity to form the another inner-outer display entity pair with the inner display entity of the rejected inner-outer display entity pair.

10. The method of claim 8, wherein the method further comprises the layout generator, on rejecting the placement of the inner display entity of the another inner-outer display entity pair in the outer display entity of the another inner-outer display entity pair, relocating a previous placement of a content item.

11. The method of claim 10 further comprising the layout generator performing a plurality of diagnostics, and identifying the previously placed content item to be relocated based at least in part on diagnostic data obtained from performance of said diagnostics.

12. The method of claim 1, wherein the method further comprises the layout generator, on accepting the placement of the inner display entity in the outer display entity, prior to said repeating, forming another inner-outer display entity pair with the inner display entity of the previously accepted inner-outer display entity pair and another outer display entity, accepting or rejecting placement of the inner display entity of the previously accepted inner-outer display entity pair into the another outer display entity based at least in part on one or more layout placement criteria that includes layout placement criteria of whether the placement represented by the another inner-outer display entity pair is better than the placement represented by the previous inner-outer display entity pair, the placement represented by the another inner-outer display entity pair supersedes the placement represented by the previous inner-outer display entity pair if placement of the inner display entity of the previously accepted inner-outer display entity pair into the another outer display entity is accepted.

13. The method of claim 1, wherein said repeating comprises the layout generator, on accepting the placement of the inner display entity that is another display container in the outer display entity, forming another inner-outer display entity pair having another inner display and another outer display entity, and accepting or rejecting placement of the another inner display entity into the another outer display entity based at least in part on one or more layout placement criteria.

14. The method of claim 13, wherein the another inner display entity of the another inner-outer display entity pair is the outer display entity of the inner-outer display entity pair.

15. The method of claim 13, wherein the method further comprises the layout generator evaluating one or more layout completion criteria.

16. The method of claim 14, wherein the one or more layout completion criteria comprise at least one of:

a criterion associate with placement of a sufficient set of content items, a criterion associated with display space utilization, and a criterion associated with display aesthetics.

17. The method of claim 1, wherein the method further comprises the layout generator modifying at least one of inner and outer display entities of the inner-outer display entity pair, and the accepting or rejecting is based on the modified inner-outer display entity pair.

18. The method of claim 17, wherein said modifying comprises at least a selected one of:

converting a content item from absolute to percentage sizing, providing a graphic treatment to a content item, relocating a display entity, modifying a size of a display entity, and modifying a shape of a display entity.

19. The method of claim 1, wherein the outer display entity is a display container, and the method further comprises the layout generator creating the display container.

20. The method of claim 1, further comprises the layout generator ordering content items prior to or after performing said forming and accepting, or said forming and rejecting.

21. The method of claim 20 wherein said ordering is performed based on values of the content items and/or diagnostic data gathered on the content items.

22. The method of claim 1, further comprises the layout generator ordering display containers prior to or after performing said forming and accepting, or said forming and rejecting.

23. The method of claim 22 wherein said ordering is performed based on remaining content item holding capacity of the display containers.

24. The method of claim 1, wherein said forming comprises the layout generator selecting the inner display entity by a first execution thread, and selecting the outer display entity by a second execution thread, said first and second execution threads being different execution threads.

25. The method of claim 1, further comprising the layout generator receiving a plurality of content items from one or more sources selected from the group consisting of an application, a content cache, and a content server.

26. The method of claim 25, wherein said forming and accepting, or said forming and rejecting are performed to generate a rendering layout specification for rendering the plurality of content items.

27. The method of claim 26, further comprising a render engine processing the generated rendering layout specification, and rendering the content items in accordance with the rendering layout specification.

28. The method of claim 25, wherein said rendering comprises the render engine rendering on a selected one of a display surface of a display device, a logical display pane, a portion of a display window, an electronic page, a portion of an electronic page, a portion of a printed page and a printed page.

29. A computer readable medium comprising a plurality of programming instructions configured to program an apparatus having a processor to enable the apparatus to practice the processor implemented method as set forth in claim 1.

30. An apparatus comprising:

a processor;

an inner-outer display entity pair formation module operated by the processor to successively form one or more inner-outer display airs for automated layout of a plurality of content item, each inner-outer display entity pair having an inner display entity and an outer display entity, the outer display entity being a display container, and the inner display entity being a selected one of said content items and another display container; and an acceptance or rejection module operated by the processor to successively accept or reject placement of the inner display entity of each inner-outer display entity pair into the outer display entity of the inner-outer display entity pair, based at least in part on one or more layout placement criteria.

31. The apparatus of claim 30, wherein the apparatus comprising a layout generator comprising the inner-outer display entity pair formation module and the acceptance or rejection module.

32. The apparatus of claim 31, wherein the layout generator is configured to perform said forming and accepting, or said forming and rejecting to generate a rendering layout specification for rendering the plurality of content items.

33. The apparatus of claim 31, further comprising a render engine coupled to the layout generator, and operated by the processor, to process the generated rendering layout specification, and render the content items in accordance with the rendering layout specification.

34. The apparatus of claim 30, wherein each display container having one or more display units of a display presentation, the layout placement criteria including a criterion associated with placement of subconstituents of a content item in a display unit, when the inner-outer pair is a content item-display container pair and the content item has subconstituents, and the inner-outer display entity pair formation module and the acceptance or rejection module are operated by the processor as two execution threads.

* * * * *

UNITED STATES PATENT AND TRADEMARK OFFICE
CERTIFICATE OF CORRECTION

PATENT NO. : 7,409,635 B2  Page 1 of 1
APPLICATION NO. : 11/281780
DATED : August 5, 2008
INVENTOR(S) : Samuel S. Epstein It is certified that error appears in the above-identified patent and that said Letters Patent is hereby corrected as shown below:

Column 18

Line 67, "display airs" should read --display entity pairs--

Column 18

Line 67, "plurality of content item" should read --plurality of content items--

Signed and Sealed this

Twenty-ninth Day of June, 2010

David J. Kappos
*Director of the United States Patent and Trademark Office*